(12) United States Patent
Morita et al.

(10) Patent No.: US 12,368,167 B2
(45) Date of Patent: Jul. 22, 2025

(54) CONDUCTIVE MATERIAL DISPERSION, METHOD FOR PRODUCING THE SAME, AND COMPOSITION FOR SECONDARY BATTERY ELECTRODE, ELECTRODE FILM, SECONDARY BATTERY, AND VEHICLE USING CONDUCTIVE MATERIAL DISPERSION

(71) Applicants: artience Co., Ltd., Tokyo (JP); TOYOCOLOR CO., LTD., Tokyo (JP)

(72) Inventors: Yu Morita, Tokyo (JP); Tetsuro Izumiya, Tokyo (JP); Yu Aotani, Tokyo (JP)

(73) Assignees: Artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 86 days.

(21) Appl. No.: 17/921,544

(22) PCT Filed: Apr. 9, 2021

(86) PCT No.: PCT/JP2021/015040
§ 371 (c)(1),
(2) Date: Oct. 26, 2022

(87) PCT Pub. No.: WO2021/220773
PCT Pub. Date: Nov. 4, 2021

(65) Prior Publication Data
US 2023/0187644 A1    Jun. 15, 2023

(30) Foreign Application Priority Data

Apr. 27, 2020  (JP) .................................. 2020-078026
Dec. 11, 2020  (JP) .................................. 2020-205488

(51) Int. Cl.
*H01M 4/62* (2006.01)
*C08K 3/04* (2006.01)

(52) U.S. Cl.
CPC .............. *H01M 4/625* (2013.01); *C08K 3/04* (2013.01); *C08K 3/041* (2017.05); *C08K 2201/001* (2013.01); *C08K 2201/003* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 6,294,291 B1 | 9/2001 | Ozaki et al. | |
| 8,034,485 B2 | 10/2011 | Dahn et al. | |
| 8,455,583 B2 | 6/2013 | Krishnamoorti et al. | |
| 2015/0111025 A1* | 4/2015 | Nishino | B82Y 40/00 428/323 |
| 2015/0364749 A1 | 12/2015 | Kim | |
| 2018/0175370 A1 | 6/2018 | Kim et al. | |
| 2019/0044150 A1 | 2/2019 | Kim et al. | |
| 2021/0214229 A1 | 7/2021 | Morita et al. | |
| 2021/0226222 A1 | 7/2021 | Morita et al. | |

FOREIGN PATENT DOCUMENTS

| | | | |
|---|---|---|---|
| EP | 3786110 A1 | 3/2021 | |
| JP | 4-155776 A | 5/1992 | |
| JP | 4-237971 A | 8/1992 | |
| JP | 2004-178922 A | 6/2004 | |
| JP | 2005-162877 A | 6/2005 | |
| JP | 2008-508417 A | 3/2008 | |
| JP | 2011-70908 A | 4/2011 | |
| JP | 2013-186034 A | 9/2013 | |
| JP | 2013-229163 A | 11/2013 | |
| JP | 2014-2885 A | 1/2014 | |
| JP | 2014-28935 A | 2/2014 | |
| JP | 2014028935 A * | 2/2014 | ............. C08B 11/12 |
| JP | 2016-28109 A | 2/2016 | |
| JP | 2016-204203 A | 12/2016 | |
| JP | 2017-10822 A | 1/2017 | |
| JP | 2017-502459 A | 1/2017 | |
| JP | 2017024964 A * | 2/2017 | ............. B01J 23/755 |
| JP | 2017-84682 A | 5/2017 | |
| JP | 2017206413 A * | 11/2017 | ............. B82Y 30/00 |
| JP | 2017216129 A * | 12/2017 | ............... C08K 7/06 |
| JP | 2018-533175 A | 11/2018 | |
| JP | 2018-534731 A | 11/2018 | |
| JP | 2019-192537 A | 10/2019 | |

(Continued)

OTHER PUBLICATIONS

International Search Report dated Jun. 22, 2021 issued by the International Searching Authority in Application No. PCT/JP2021/015040.
Written Opinion dated Jun. 22, 2021 issued by the International Searching Authority in Application No. PCT/JP2021/015040.
Notice of Reasons for Revocation issued on Jun. 10, 2022 in Japanese Application No. 2021-700997.
Notice of Reasons for Revocation issued on Feb. 4, 2022 in Japanese Application No. 2021-700997.
Yoshiyuki Komoda et al., "Particle Packing Process in the Coated Film of Particle Dispersions during Drying", The Micromeritics, 2018, No. 61, pp. 21-27, Abstract Only (3 pages total).

(Continued)

*Primary Examiner* — Khanh T Nguyen
(74) *Attorney, Agent, or Firm* — Sughrue Mion, PLLC

(57) ABSTRACT

Provided is a conductive material dispersion including: a conductive material containing at least one kind selected from the group consisting of a carbon nanotube and carbon black; carboxymethyl cellulose or its salt; and water. The carboxymethyl cellulose or its salt has a weight average molecular weight of 10,000 to 150,000 and an etherification degree of 0.5 to 0.9. A product of the complex elastic modulus (Pa) and the phase angle (°) of the conductive material dispersion is 100 or more and 1,500 or less.

19 Claims, No Drawings

(56) References Cited

FOREIGN PATENT DOCUMENTS

| | | |
|---|---|---|
| JP | 2019-210173 A | 12/2019 |
| JP | 2020-1960 A | 1/2020 |
| JP | 6860740 B1 | 4/2021 |
| JP | 2021-72279 A | 5/2021 |
| KR | 10-2017-0069141 A | 6/2017 |
| WO | 2014/002885 A1 | 1/2014 |

OTHER PUBLICATIONS

Tomoaki Goto et al., "Rheology Control of Ceramic Slurries for Sintering of Thin Films", Journal of Society of Rheology, Japan, 2001, vol. 29, No. 4, pp. 205-210 (6 pages total).

Jing Li et al., "Impact of Binder Choice on the Performance of $\alpha$-$Fe_2O_3$ as a Negative Electrode", Journal of The Electrochemical Society, 2008, vol. 155, No. 11, pp. A812-A816 (5 pages total).

Notice of Reason for Rejection dated Apr. 25, 2025 in Korean Application No. 10-2022-7036779.

\* cited by examiner

CONDUCTIVE MATERIAL DISPERSION, METHOD FOR PRODUCING THE SAME, AND COMPOSITION FOR SECONDARY BATTERY ELECTRODE, ELECTRODE FILM, SECONDARY BATTERY, AND VEHICLE USING CONDUCTIVE MATERIAL DISPERSION

This application is a National Stage of International Application No. PCT/JP2021/015040 filed Apr. 9, 2021, claiming priority based on Japanese Patent Application No. 2020-078026 filed Apr. 27, 2020 and Japanese Patent Application No. 2020-205488 filed Dec. 11, 2020.

TECHNICAL FIELD

The present invention relates to a conductive material dispersion, a method for producing the same, and a composition for a secondary battery electrode, an electrode film, a secondary battery, and a vehicle using the conductive material dispersion.

BACKGROUND OF THE INVENTION

The capacity of lithium ion secondary batteries greatly depends on the positive electrode active material and the negative electrode active material as the main material. Therefore, various materials have been studied actively. However, the charging capacity of all the active materials in practical use has reached close to the theoretical value and improvements are close to the limit. If the amount of the active material filled in the battery is increased, the capacity can be simply increased. Therefore, an attempt has been made to reduce the addition amounts of a conductive material and binder which do not directly contribute to the capacity. Between them, the conductive material forms a conductive path inside the battery and has a role of preventing cutting of the conductive path due to the expansion and contraction of the active material by connecting the active material particles. It is effective to form an efficient conductive network by using a conductive material dispersion in order to maintain the performance with a small addition amount (Patent Literature 1).

As conductive materials, carbon black, Ketjen black, graphene, fine carbon materials, and the like are used. Suppose that a carbon nanotube having a small outer diameter and a large specific surface area in particular is used among carbon nanotubes which are a kind of fine carbon fibers. In the above case, it is possible to efficiently form a conductive network with a small amount and reduce the amount of conductive material contained in a positive electrode and a negative electrode of a lithium ion secondary battery. By adding carbon nanotubes to a graphite or silicon negative electrode, the electrode resistance is reduced, the load resistance of the battery is improved, the strength of the electrode is increased, and the expansion/contraction property of the electrode is increased. Accordingly, the cycle life of a lithium ion secondary battery is improved (Patent Literatures 2, 3 and 4). Silicon-based active materials have higher theoretical capacity than graphite and can contribute to higher battery capacity. However, the volume change associated with charge and discharge is remarkable. Therefore, an attempt has been made to pulverize a silicon-based active material, form a thin carbon film on the surface of the particles, and use it in combination with graphite in order to improve the cycle life.

In a negative electrode in which graphite and a silicon-based active material are used in combination, the selection of a binding agent becomes a very difficult problem. The styrene-butadiene rubber (SBR) used in the graphite single system has remarkably deteriorated characteristics in the system in which graphite and a silicon-based active material are combined. The SBR is designed to bind active material particles with particles of rubber and to bring the active material into contact with an electrolyte. However, if a silicon-based negative electrode active material of which the expansion and contraction is larger than that of graphite is contained, the SBR alone has a weak binding force and there is a problem that the binding is broken at the beginning of the charge/discharge cycle. Therefore, a method has been employed in which an SBR is used with a binding agent such as polyacrylic acid or polyacrylic acid salt uniformly dispersed or dissolved in water, and accordingly the surface of the active material is widely covered with the binding agent and the surface resin layer binds the active material together (Patent Literature 5). However, when a low molecular weight polyacrylic acid or polyacrylic acid salt is used as a binder, good cycle characteristics cannot be obtained (Patent Literature 6 and Non-Patent Literature 1).

With regard to the positive electrode also, studies have been performed to reduce the electrode resistance by adding carbon nanotubes (Patent Literatures 7 and 8). Many of the positive electrode active materials are unstable with respect to water, but lithium iron phosphate is relatively stable with respect to water, for example. From the above, a secondary battery electrode can be produced by using water as a dispersion medium. Since lithium iron phosphate is particularly poor in conductivity, it is common to use it by forming a thin carbon film. Since lithium iron phosphate has a high lithium diffusion resistance in a solid, a method for improving the resistance as an electrode film by using it as fine particles is known.

In addition, from the viewpoint of environmental load reduction and cost reduction, the demand for a conductive material dispersion using water as a dispersion medium is increasing. However, carbon nanotubes are difficult to disperse into water because carbon nanotubes have high hydrophobicity and various attempts have been reported. Patent Literature 9 discloses a dispersion of a carbon nanotube-containing composition containing carboxymethyl cellulose or its salt having a weight average molecular weight of 5000 or more and 60,000 or less which is measured based on gel permeation chromatography and an aqueous solvent, for example. Patent Literature 10 discloses a dispersion of a carbon nanotube-containing composition containing a dispersion medium and a dispersing agent containing carboxymethyl cellulose or its salt having an etherification degree of 0.4 or more and less than 0.7. Patent Literature 11 discloses a method for improving conductivity by dispersing, in water, a carbon nanotube having an outer diameter of 50 nm or more and 110 nm or less together with carboxymethyl cellulose sodium salt and using the carbon nanotube for a secondary battery electrode.

Patent Literature 12 discloses a conductive material dispersion using carboxymethyl cellulose having an average polymerization degree of 500 or more and 2500 or less. In order to obtain a viscosity suitable for coating, the dispersion is performed by using a bead mill and there was a problem that the structure of the conductive material is reduced. Patent Literature 13 discloses a conductive material dispersion containing carbon black having a specific surface area of 25 $m^2/g$ or more and 300 $m^2/g$ or less. A large amount of dispersing agent was required to prepare a conductive material dispersion with excellent dispersion stability. Patent Literature 14 discloses an aqueous conductive material dispersion using ethyl cellulose as a dispersing agent. However, it was difficult to include a high concentration of the conductive material in the dispersion to prepare a conductive material dispersion excellent in dispersibility.

In general, the smaller the outer diameter of the carbon nanotube, the larger the specific surface area. Therefore, the wettability with respect to water deteriorates and it becomes difficult to obtain a highly concentrated and good dispersion. However, carbon nanotubes having a smaller outer diameter and a higher specific surface area can ideally form an efficient conductive network. Therefore, it has been an urgent matter to obtain a dispersion in which carbon nanotubes having a small outer diameter and a high specific surface area are well dispersed. Further, in a dispersion having a low concentration of carbon nanotubes, there arises a problem that the degree of design freedom is reduced when a material such as an active material or a binder is mixed therein, and a problem that the transportation cost per carbon nanotube solid content is increased. Therefore, it has also been required to disperse carbon black or carbon nanotubes having a small outer diameter and a high specific surface area at a high concentration.

CITATION LIST

Patent Literature

Patent Literature 1: Japanese Patent Application Publication No. 2005-162877
Patent Literature 2: Japanese Patent Application Publication No. Hei 4-155776
Patent Literature 3: Japanese Patent Application Publication No. Hei 4-237971
Patent Literature 4: Japanese Patent Application Publication No. 2004-178922
Patent Literature 5: Japanese Patent Application Publication No. 2013-229163
Patent Literature 6: U.S. Patent No. 8034485
Patent Literature 7: Japanese Patent Application Publication No. 2011-70908
Patent Literature 8: Japanese Patent Application Publication No. 2005-162877
Patent Literature 9: Japanese Patent Application Publication No. 2014-002885
Patent Literature 10: Japanese Patent Application Publication No. 2016-204203
Patent Literature 11: Japanese Patent Application Publication No. 2016-028109
Patent Literature 12: Japanese Patent Application Publication No. 2017-10822
Patent Literature 13: Japanese Patent Application Publication No. 2017-84682
Patent Literature 14: Japanese Patent Application Publication No. 2011-70908

Non-Patent Literature

Non-Patent Literature 1: J. Electrochem. Soc. 2008, 155, A812-A816

SUMMARY OF THE INVENTION

Problems to be Solved by the Invention

The dispersions of the carbon nanotube-containing compositions disclosed in Patent Literatures 9 and 10 are not able to contain carbon nanotubes of several mass % or more, for example. Further, the dispersion disclosed in Patent Literature 11 does not have sufficient dispersibility for dispersing carbon nanotubes having a small outer diameter and a high specific surface area. Further, since a carbon nanotube dispersion at a high concentration tends to generate aggregates and precipitates during storage, the dispersion also has a problem in terms of storage stability. In order to prevent sedimentation, a method is effective in which the viscosity of the carbon nanotube dispersion is increased by using a dispersing agent having a high molecular weight. However, there are also problems in which the coating property is lowered and gelation easily occurs. Further, in the method for preparing a negative electrode for a secondary battery disclosed in Patent Literature 5, the following are recommended: a method of adding dissolved polyacrylic acid to a composition for a secondary battery electrode and performing a coating treatment on the surface of a silicon-based active material. However, if carbon nanotubes are used as conductive materials, there has been a problem that a non-uniform distribution of polyacrylic acid occurs even if the above method is used.

Further, the inventors have found, as a result of studies, that it is difficult to obtain a high concentration and good dispersion state using water as a dispersion medium, for an active material such as a silicon-based active material or lithium iron phosphate which is pulverized and has a carbon film formed on the surface thereof for the same reason as the above carbon nanotubes. Therefore, it has been found that it is particularly difficult to obtain a good dispersion state when an active material such as a silicon-based active material or lithium iron phosphate which is pulverized and has a carbon film formed on the surface thereof is combined with carbon nanotubes in addition to various active materials. As a result, it is found that it is also difficult to obtain a secondary battery having excellent rate characteristics and cycle characteristics.

An object of the present invention is to provide a conductive material dispersion having high concentration and high dispersibility and a composition for a secondary battery electrode in order to obtain an electrode film having high conductivity. More specifically, an object of the present invention is to provide a secondary battery having excellent rate characteristics and cycle characteristics.

An object of an embodiment of the present invention is to provide a conductive material dispersion having a high concentration and high dispersibility and a method for producing the same. Another object of another embodiment of the present invention is to provide a composition for a secondary battery electrode. Still another object of a still another embodiment of the present invention is to provide an electrode film capable of enhancing the output and cycle life of a secondary battery and a secondary battery having a high output and a good cycle life. Still yet another object of still yet another embodiment of the present invention is to provide a vehicle including a secondary battery.

Means for Solving the Problem

As a result of intensive studies made by the present inventors, a conductive material dispersion contains carboxymethyl cellulose or its salt having a specific weight average molecular weight and an etherification degree and a conductive material containing at least one kind selected from the group consisting of a carbon nanotube and carbon black. The carbon nanotube and/or carbon black can be satisfactorily dispersed in water and a good conductive network can be maintained with a small addition amount by performing dispersing such that the product (X×Y) of the complex elastic modulus X (Pa) and the phase angle Y (°) becomes 100 or more and 1,500 or less. This can enhance the rate characteristic and the cycle life of a secondary battery.

Examples of embodiments of the present invention are shown below.

An embodiment of the present invention relates to a conductive material dispersion including: a conductive material containing at least one kind selected from the group consisting of a carbon nanotube and carbon black; carboxymethyl cellulose or its salt; and water, in which the carboxymethyl cellulose or its salt has a weight average molecular weight of 10,000 to 150,000 and an etherification degree of 0.5 to 0.9, and a product (X×Y) of a complex elastic modulus X (Pa) and a phase angle Y (°) of the conductive material dispersion is 100 or more and 1,500 or less.

Another embodiment of the present invention relates to the conductive material dispersion in which the carboxymethyl cellulose or its salt has a weight average molecular weight of 10,000 to 100,000.

Another embodiment of the present invention relates to a conductive material dispersion including: a carbon nanotube; carboxymethyl cellulose or its salt; and water, in which the carboxymethyl cellulose or its salt has a weight average molecular weight of 10,000 to 100,000 and an etherification degree of 0.5 to 0.9, and a product (X×Y) of a complex elastic modulus X (Pa) and a phase angle Y (°) of the conductive material dispersion is 100 or more and 1,500 or less.

Another embodiment of the present invention relates to the conductive material dispersion in which the amount of acidic group of the carbon nanotube is 0.1 to 0.8 $\mu mol/m^2$.

Another embodiment of the present invention relates to the conductive material dispersion in which the amount of acidic group of the carbon nanotube is 40 to 500 $\mu mol/g$.

Another embodiment of the present invention relates to the conductive material dispersion in which the complex elastic modulus is 50 Pa or less and the phase angle is 15 degrees or more.

Another embodiment of the present invention relates to the conductive material dispersion in which the carbon nanotubes includes a first carbon nanotube having an average outer diameter of 0.5 nm or more and less than 5 nm and a second carbon nanotube having an average outer diameter of 5 nm or more and 20 nm or less, and a mass ratio of the first carbon nanotube to the second carbon nanotube is 1:10 to 1:100.

Another embodiment of the present invention further relates to the conductive material dispersion further including a polyacrylic acid.

Another embodiment of the present invention relates to the conductive material dispersion in which a median diameter of the conductive material dispersion is 0.5 μm or more and 2.0 μm or less.

Another embodiment of the present invention relates to the conductive material dispersion in which the conductive material dispersion has a TI value of 2.0 to 5.0.

Another embodiment of the present invention relates to the conductive material dispersion in which a gloss of a coating film of the conductive material dispersion measured at 60 degrees relative to an incident angle is 5 to 120.

Another embodiment of the present invention relates to the conductive material dispersion in which pH of the conductive material dispersion is 7.0 to 10.5.

Another embodiment of the present invention relates to a composition for a secondary battery electrode including the conductive material dispersion described above.

Another embodiment of the present invention relates to an electrode film including a coating film of the composition for a secondary battery electrode described above.

Another embodiment of the present invention relates to a secondary battery including the electrode film described above.

Another embodiment of the present invention relates to a method for producing the conductive material dispersion described above in which steps of (1) and (2) below are performed in this order, the method including: (1) a step of performing dispersing at a pressure of 60 to 120 MPa by using a high-pressure homogenizer and setting a median diameter to 4.0 μm or less; and (2) a step of performing dispersing until a phase angle becomes 40 degrees or more by using a bead mill.

Another embodiment of the present invention relates to a vehicle including the secondary battery described above.

Advantageous Effect of the Invention

According to embodiments of the present invention, it is possible to provide a conductive material dispersion having a high concentration and high dispersibility and a method for producing the same, and a composition for a secondary battery electrode. Further, according to embodiments of the present invention, it is possible to provide an electrode film capable of enhancing the output and cycle life of a secondary battery and a secondary battery having a high output and a good cycle life. According to embodiments of the present invention, it is possible to provide a vehicle including a secondary battery.

DETAILED DESCRIPTION OF THE INVENTION

Hereinafter, a carbon nanotube, carbon black, carboxymethyl cellulose and its salt, carbon nanotube and carbon black dispersions, a composition for a secondary battery electrode, an electrode film, a secondary battery, a vehicle, and the like of embodiments of the present invention will be described in detail. The present invention is not limited to the following embodiments, and the present invention also includes embodiments that are implemented without changing the gist of the present invention.

A carbon nanotube is sometimes referred to herein as "CNT". Carboxymethyl cellulose is sometimes referred to as "CMC". In the present specification, the conductive material dispersion may be simply referred to as a "dispersion".

<Conductive Material Dispersion>

The conductive material dispersion contains at least one kind selected from the group consisting of CNT and carbon black as conductive materials, CMC or its salt, and water.

[Carbon Nanotube]

A carbon nanotube (CNT) that can be used as a conductive material has a shape in which planar graphite is cylindrically wound. The carbon nanotube includes a single-walled CNT or a multi-walled CNT and may include a combination thereof. The single-walled CNT has a structure in which one layer of graphite is wound. The multi-walled CNT has a structure in which two or three or more layers of graphite are wound. In addition, the sidewalls of the CNT do not need to have a graphite structure. It is assumed that a CNT that has sidewalls having an amorphous structure is also included in the CNT of the present specification, for example.

The shape of the CNT is not limited. Examples of the shape of the CNT include a variety of shapes such as a needle-like shape, a cylindrical tube-like shape, a fishbone-like shape (fishbone or cup-stacked type), a playing card-like shape (platelet), and a coil-like shape. In the present embodiment, the CNT preferably has a needle-like shape or a cylindrical tube-like shape from among the above. The CNT may have a single shape or a combination of two or more shapes.

Forms of the CNT include a graphite whisker, filamentous carbon, a graphite fiber, an ultrafine carbon tube, a carbon tube, a carbon fibril, a carbon microtube, and a carbon nanofiber, for example. The CNT may have a single form from among the above or a combination of two or more forms.

The amount of an acidic group of the CNT can be determined from the adsorbed amount of hexylamine based on back titration. The amount of acidic group of the CNT determined from the adsorbed amount of hexylamine is preferably 0.1 µmol/m$^2$ or more and more preferably 0.2 µmol/m$^2$ or more based on the surface area of the CNT calculated based on the BET method. Further, the amount of acidic group is preferably 0.8 µmol/m$^2$ or less and more preferably 0.7 µmol/m$^2$ or less. The amount of acidic group of the CNT determined from the adsorbed amount of hexylamine is preferably 40 µmol/g or more, more preferably 50 µmol/g or more, and still more preferably 120 µmol/g or more based on the mass of the CNT. Further, the amount of acidic group is preferably 500 µmol/g or less, more preferably 250 µmol/g or less, and still more preferably 220 µmol/g or less. By setting the amount of acidic group of the CNT in the above range, the affinity balance between the CMC and water as the dispersion medium is improved, and accordingly an excellent conductive material dispersion can be obtained. A conductive material dispersion containing CNT is also referred to as a CNT dispersion.

The outer diameter of the CNT is preferably 0.5 nm or more, more preferably 1 nm or more, and still more preferably 5 nm or more. Further, the outer diameter is preferably 30 nm or less, more preferably 20 nm or less, and still more preferably 13 nm or less. The average outer diameter is obtained by first observing and capturing an image of the CNT by using a transmission electron microscope. Next, any 300 CNTs in the observation photograph are selected and the outer diameter of each CNT is measured. Accordingly, the average outer diameter can be calculated by using the average value.

Suppose that two or more kinds of CNTs having different average outer diameters are used as the CNT. In the above case, the average outer diameter of a first CNT is preferably 0.5 nm or more and more preferably 1 nm or more. The average outer diameter is preferably less than 5 nm. The average outer diameter of a second CNT is preferably 5 nm or more and 30 nm or less and more preferably 5 nm or more and 20 nm or less. The average outer diameter of the CNT can be calculated by observing the forms of the CNT by using a transmission electron microscope (manufactured by JEOL) and measuring the lengths of the short axes and using the number and the average value.

Suppose that two or more kinds of CNTs having different average outer diameters are used as the CNT. In the above case, the mass ratio of the first CNT to the second CNT is preferably 1:10 to 1:100 and more preferably 1:10 to 1:50.

A CNT having a small outer diameter is preferable because the CNT can conduct between active materials in an electrode layer which are separated by a distance and easily follows the expansion and contraction of the active materials in accordance with charging and discharging. In addition, a CNT having a large outer diameter is preferable because the CNT can conduct between active materials which are close to each other and has a high probability of contact with the active materials.

The specific surface area of the CNT is preferably 100 m$^2$/g or more, more preferably 150 m$^2$/g or more, and still more preferably 200 m$^2$/g or more. Further, the specific surface area is preferably 1200 m$^2$/g or less and more preferably 1000 m$^2$/g or less. The specific surface area of the CNT is calculated based on the BET method by means of nitrogen adsorption measurement.

The carbon purity of the CNT is expressed by the content (mass %) of carbon atoms in the CNT. The carbon purity is preferably 80 mass % or more, more preferably 90 mass % or more, still more preferably 95 mass % or more, and particularly preferably 98 mass % or more relative to 100 mass % of the CNT. By setting the carbon purity to the above range, it is possible to prevent a defect such as the occurrence of a short caused by the formation of dendrite due to an impurity.

The content of the CNT is preferably 0.2 mass % or more, more preferably 0.4 mass % or more, and still more preferably 1 mass % or more of the non-volatile content of the conductive material dispersion. Further, the content of the CNT is preferably 30 mass % or less, more preferably 20 mass % or less, and still more preferably 10 mass % or less. By making the content of the CNT into the above range, the CNT can be favorably and stably present without causing sedimentation and gelation. It is preferable that the content of the CNT is adjusted appropriately such that a carbon nanotube dispersion having an appropriate fluidity or viscosity can be obtained by means of the specific surface area of the CNT, the affinity to the dispersion medium, the dispersing ability of the dispersing agent, and the like.

[Carbon Black]

Examples of the carbon black include acetylene black, furnace black, hollow carbon black, channel black, thermal black, Ketjen black, and the like. The carbon black may be neutral, acidic, or basic. Carbon black subjected to an oxidation treatment or carbon black subjected to a graphitization treatment may be used.

The average primary particle diameter of the carbon black is preferably 0.01 to 1 µm, more preferably 0.01 to 0.2 µm, and still more preferably 0.01 to 0.1 µm as similar to the average primary particle diameter range of carbon black used in general dispersions or paints. The average primary particle diameter here refers to an arithmetic mean particle diameter measured by using an electron microscope. This physical property value is generally used to represent physical properties of carbon black.

The BET specific surface area and pH are known as other physical property values representing the physical properties of carbon black. The BET specific surface area refers to the specific surface area (hereinafter referred to simply as specific surface area) measured based on the BET method by means of nitrogen adsorption. The specific surface area corresponds to the surface area of carbon black. The larger the specific surface area, the larger the amount of dispersing agent required. The pH changes by being affected by functional groups and contained impurities of the surface of carbon black.

The BET specific surface area of carbon black is preferably 20 to 1500 m²/g, more preferably 30 to 1000 m²/g, and particularly preferably 100 to 300 m²/g.

[Carboxymethyl Cellulose or its Salt]

The carboxymethyl cellulose (CMC) or its salt is an anionic water-soluble polymer which is obtained by using cellulose as a raw material. The weight average molecular weight of the CMC is preferably 10,000 or more. Further, the weight average molecular weight is preferably 150,000 or less, more preferably 100,000 or less, and still more preferably 70,000 or less. The weight average molecular weight is more preferably 60,000 or less and particularly preferably 30,000 or less. By setting the weight average molecular weight in the above range, the intermolecular forces of the CMC, and the CNT and carbon black, and the intermolecular forces of the CMC and water are well balanced, and the CMC can be satisfactorily dispersed and maintained in a state. The etherification degree of the CMC is preferably 0.5 or more and more preferably 0.6 or more. Further, the etherification degree is preferably 0.9 or less and more preferably 0.8 or less. By setting the etherification degree in the above range, the CMC can have an appropriate affinity with water, CNT and carbon black. Further, if a secondary battery is used, it is possible to prevent a defect in which the dispersing agent is dissolved in the electrolyte in the battery and the viscosity of the electrolyte increases.

The method for producing the CMC or its salt is not particularly limited, and the CMC or its salt can be produced by means of a general method for producing CMC or its salt. The CMC or its salt is produced by performing a mercerization reaction in which an alkali is reacted with cellulose, and then adding an etherifying agent to the obtained alkali cellulose to perform an etherification reaction. The CMC or its salt can be produced as follows, for example: after a mercerization reaction is performed by using a mixed solvent containing water and an organic solvent, an etherification reaction is performed by adding monochloroacetic acid, and after the excess alkali is neutralized with an acid, the mixed solvent is removed, washed, dried, and then pulverized. The cellulose raw material can be reduced in molecular weight by extending the reaction time of the mercerization reaction.

The weight average molecular weight of the CMC is preferably 10,000 or more and more preferably 15,000 or more based on the weight average molecular weight of pullulan. Further, the weight average molecular weight is preferably 100,000 or less, more preferably 60,000 or less, and still more preferably 30,000 or less. If the CMC has an appropriate weight average molecular weight, the adsorbability to the CNT and carbon black is enhanced, and the stability of a dispersion element is further enhanced. In addition, by setting the weight average molecular weight in the above range, the hygroscopicity becomes high, and the deterioration in the film strength can be suppressed. Further, it is possible to prevent an increase in the viscosity due to hydrogen bonding in the aqueous solution and deterioration in the charging property and the machine storage stability of the CNT and carbon black. In addition, suppose that the dispersing machine used is a type in which a liquid to be dispersed passes through a narrow channel such as a nozzle type high-pressure homogenizer. In the above case, transfer to the narrow channel becomes difficult, and deterioration in the dispersion efficiency can be suppressed.

There are many commercially available CMCs having a higher molecular weight than the above preferred range. Therefore, the CMCs may be reduced in molecular weight by being subjected to a hydrolysis reaction in an acidic aqueous solution. The weight average molecular weight of CMC to be hydrolyzed is preferably more than 60,000 and 500,000 or less. If the weight average molecular weight is 500,000 or less, the hydrolysis reaction takes time and it is possible to suppress the occurrence of a large amount of oxidative decomposition products of the CMC. Accordingly, purification becomes easy. The hydrolysis reaction in an acidic aqueous solution proceeds in a short time by heating and pressurizing. The molecular weight of the CMC can be controlled by adjusting the reaction time, temperature, and pH. The reaction can be stopped by cooling and neutralizing with alkali to pH7 or higher. Generally available acids and bases may be used.

The content of the CMC or its salt is preferably 10 mass % or more and more preferably 20 mass % or more based on the mass of the CNT and carbon black. Further, the content is preferably 100 mass % or less, more preferably 60 mass % or less, and still more preferably 40 mass % or less. By setting the content in the above range, the CNT and carbon black can be satisfactorily and stably present without impairing conductivity when used in the secondary battery electrode. From the viewpoint of coating processability and storage stability, CMC having a higher molecular weight than the CMC used in the dispersion may be added. If CMC having a high molecular weight is added, it is preferably to add the CMC after the CNT dispersion is produced or at the end of the dispersion process. If the CMC is added from the initial stage of the dispersion, defects may occur as follows: the viscosity of the dispersion medium becomes too high and the stirring efficiency deteriorates, or the adsorption equilibrium for the CNT changes and the dispersibility deteriorates.

[Dispersion Medium]

The dispersion medium is water and may optionally include a water-soluble solvent. Examples of the water-soluble solvent include alcohols such as ethanol, propanol, butanol, methyl cellosolve, butyl cellosolve, and propylene glycol monomethyl ether, and N-methyl-2-pyrrolidone (NMP) and the like.

[Other Components]

The conductive material dispersion can be blended with other additives such as a dispersing agent, a wetting agent, an antifoaming agent, a surfactant, a pH adjusting agent, a wetting/penetrating agent, an antioxidant, an antiseptic agent, a fungicidal agent, and a leveling agent; or a water-soluble dispersion medium, a conductive material other than CNT and carbon black, and a polymer component other than CMC when necessary. The blending can be performed appropriately within a range that does not interfere with objects of the embodiments of the present invention. The addition can be performed at any timing such as before preparation of a dispersion element, during dispersion, and after dispersion. As the conductive material other than CNT and carbon black, one or more kinds of carbon materials such as graphite may be used in combination, for example. Polyacrylic acid is preferably used as the pH adjusting agent. Polyacrylic acid having any degree of polymerization can be used and polyacrylic acid may be used as a copolymer with any monomer. Polyacrylic acid may be produced by means of a generally known synthetic method or a commercial product may be used.

The molecular weight of the polyacrylic acid acting as the pH adjusting agent is not particularly limited. However, the weight average molecular weight is preferably 5,000 to 100,000 and more preferably 10,000 to 50,000.

It is preferable that the polyacrylic acid acting as the pH adjusting agent is not neutralized. If the carboxyl group is neutralized, the polyacrylic acid generates a phenomenon of counter-ion condensation, and the viscosity of the aqueous solution is remarkably increased. Due to the increase in the viscosity of the aqueous solution, the ease of handling of the conductive material dispersion deteriorates. Additionally, a small amount of water during the preparation of the electrode composition described below is retained even after the drying process, which may affect the performance of the secondary battery.

The pH of the conductive material dispersion is preferably 7.0 or more and 10.5 or less and preferably 9.0 or more and 10.5 or less. If the pH is in the above range, the conductive material dispersion can be suppressed from becoming gelled easily. In addition, problems such as corrosion of various raw materials and exterior materials in the battery or gelation of the binder can be suppressed. The pH can be measured by using a general pH meter.

The dispersibility of the conductive material such as the CNT and carbon black in the conductive material dispersion can be evaluated by means of a dynamic viscoelastic measurement using the complex elastic modulus and a phase angle. The complex elastic modulus indicates the hardness of the conductive material dispersion, and the higher the dispersibility of the conductive material and the lower the viscosity of the conductive material dispersion, the smaller the complex elastic modulus. However, suppose that the fiber length of the carbon nanotube is large or the structure length of the carbon black is large. In the above case, even if the conductive material is uniformly and stably dissolved in the medium, the complex elastic modulus may take a high numerical value because of the structural viscosity of the conductive material itself. The phase angle means the phase shift of the stress wave when the strain given to the conductive material dispersion is a sinusoidal wave, that is, the phase angle indicates the ease with which the dispersion is able to flow. In the case of a pure elastic body, the phase angle is 0 degree because the sinusoidal wave has the same phase with the given strain. Meanwhile, in the case of a pure viscous body, the stress wave is shifted by 90 degrees. In a general viscoelastic measuring sample, a sinusoidal wave has a phase angle which is larger than 0 degree and is smaller than 90 degrees. If the dispersibility of the conductive material in the conductive material dispersion is good, the phase angle approaches 90 degrees of a pure viscous body. However, as similar to the complex elastic modulus, if the conductive material itself has structural viscosity, the phase angle may take a low numerical value even if the conductive material is uniformly and stably dissolved in the medium.

The complex elastic modulus of the conductive material dispersion is preferably 50 Pa or less, more preferably less than 20 Pa, still more preferably 10 Pa or less, and particularly more preferably 5 Pa or less. The complex elastic modulus of the conductive material dispersion is preferably 0.01 Pa or more, more preferably 0.05 Pa or more, and still more preferably 0.1 Pa or more. The phase angle of the conductive material dispersion is preferably 5 degrees or more, more preferably 19 degrees or more, still more preferably 30 degrees or more, and particularly preferably 45 degrees or more. The phase angle of the conductive material dispersion is preferably 90 degrees or less, more preferably 85 degrees or less, and still more preferably 80 degrees or less. The complex elastic modulus and phase angle can be measured based on the method described in the examples.

The complex elastic modulus and phase angle of the conductive material dispersion are determined by means of the dispersibility of the CNT and carbon black in the conductive material dispersion, the entanglement of the CNT, carbon black, the CMC, and other resin components, or the influence of the intermolecular forces thereof. From the above, suppose that the complex elastic modulus X (Pa) and the phase angle Y (degree) are set in the above preferred range and the product (X×Y) thereof is 100 or more and 1,500 or less. In the above case, a conductive material dispersion having excellent dispersion stability can be obtained. Furthermore, an electrode film having excellent conductivity can be obtained by forming an excellent conductive network. The CMC having a weight average molecular weight of 10,000 to 150,000 and an etherification degree of 0.5 to 0.9 has a low viscoelasticity. However, suppose that the product (X×Y) of the complex elastic modulus X (Pa) and the phase angle Y (degree) in the case of the conductive material dispersion is 100 or more and 1,500 or less. In the above case, the CMC can perform the role of a thickener or a binder used as the electrode composition of the secondary battery, the electrode strength can be enhanced, and the battery performance can be enhanced. It is more preferable if the complex elastic modulus is 50 Pa or less and the phase angle is 15 degrees or more. It is particularly effective to determine the dispersion state by combining the complex elastic modulus and phase angle with conventional indices such as viscosity, rather than simply requiring that the viscosity of the conductive material dispersion be low and the (apparent) dispersibility be good.

The dispersibility of the CNT in the conductive material dispersion can also be evaluated by means of the median diameter (μm) which is obtained by using a laser diffraction/scattering type particle size distribution meter. From the median diameter (μm) obtained by using the laser diffraction/scattering type particle size distribution meter, the particle diameter of CNT aggregated particles can be estimated based on the scattered light intensity distribution produced by the particles. The median diameter (μm) is preferably 0.5 μm or more and 5.0 μm or less and more preferably 0.5 μm or more and 2.0 μm or less. The CNT dispersion in an appropriate dispersion state can be obtained by making the median diameter in the above range. CNTs in an aggregated state exist if the median diameter is below the above range. Many finely cut CNTs are generated if the median diameter is above the above range. From the above, it may be difficult to form an efficient conductive network. The median diameter may be measured based on the method described in the examples.

The dispersibility of the CNT in the conductive material dispersion can also be evaluated by means of gloss measured at 60 degrees (that is, the intensity of the reflected light at 60 degrees relative to the angle of incidence) of a coating film. The coating film is obtained by performing coating on a smooth glass substrate and baking and drying. The coating film is obtained as follows for example: 1 mL of the CNT dispersion is added dropwise onto a smooth glass substrate, coating is performed at 2 cm/sec with a No. 7 bar coater, then baking is performed in a hot air oven at 140° C. for 10 minutes, and cooling is performed, for example. Three locations on the surface of the coating film except the end parts are selected at random by using a gloss meter (gloss meter, micro-gross 60° manufactured by BYK Gardner) and the average value obtained by measuring each of the three locations once can be used as the gloss at 60 degrees. With respect to the light incident on the coating film, the better the dispersibility, the higher the gloss, because the surface of the coating film becomes smooth. Meanwhile, the lower the dispersibility, the lower the gloss, because light scattering occurs due to the irregularity of the surface of the coating film. The gloss at 60 degrees may be measured based on the method described in the examples. The gloss is preferably 5 or more, more preferably 50 or more, still more preferably 60 or more, and particularly preferably 70 or more. Further, the gloss is preferably 120 or less and more preferably 110 or less. The CNT dispersion in an appropriate dispersion state can be obtained by making the gloss in the above range. CNTs in an aggregated state exist if the gloss is below the above range and many finely cut CNTs are generated if the gloss is above the above range. From the above, it becomes difficult to form an efficient conductive network.

The TI (thixotropic index) value of the conductive material dispersion can be calculated from the value obtained by dividing the viscosity (mPa·s) at 60 rpm measured by using a B-type viscometer by the viscosity (mPa·s) at 6 rpm. The TI value is preferably 2.0 or more and 5.0 or less. The higher the TI value, the greater the entanglement of the CNT, carbon black, the CMC, and other resin components, or the structural viscosity resulting from intermolecular forces thereof. The lower the TI value, the lower the structural viscosity. By setting the TI value in the above range, it is possible to suppress the entanglement of the CNT, carbon black, the CMC, and other resin components, and to make these intermolecular forces act appropriately.

The fiber length of the carbon nanotube in the conductive material dispersion is preferably 0.3 to 5 μm and more preferably 0.5 to 3.5 μm.

(Dispersion Method)

The conductive material dispersion is preferably produced by finely dispersing the CNT, carbon black, the CMC or its salt, and water after subjecting them to a dispersion treatment by using a dispersing device, for example. In the dispersion treatment, the addition timing of the material to be used may be arbitrarily adjusted and a multistage treatment in which treatment is performed two or more times may be adopted.

Examples of the dispersing device include a kneader, a two-roll mill, a three-roll mill, a planetary mixer, a ball mill, a horizontal sand mill, a vertical sand mill, an annular bead mill, an attriter, a high-shear mixer, a high-pressure homogenizer, an ultrasonic homogenizer, and the like. In particular, it is most preferable to use a high-shear mixer in the initial step of dispersing from the viewpoint of enhancing wetting of the CNT and carbon black and breaking down coarse particles, and then to use a high-pressure homogenizer from the viewpoint of performing dispersing while maintaining the fiber length of the CNT or the structure of carbon black. Further, dispersing is performing by using a high-pressure homogenizer such that the median diameter becomes 4.0 μm or less, and then further dispersing is performed by using a bead mill until the phase angle becomes 40 degrees or more. Accordingly, the dispersion state can be made uniform while maintaining the fiber length. The pressure when the high-pressure homogenizer is used is preferably 60 to 150 MPa and more preferably 60 to 120 MPa.

Examples of dispersing systems using the dispersing device include a batch type dispersion system, a pass type dispersion system, a circulation dispersion system, and the like. Any of them may be used or two or more of them may be used in combination. The batch type dispersion is a method for performing dispersing by using only the dispersing device main body without using piping or the like. Since handling is simple, this method is preferable if a small amount is to be produced. The pass type dispersion system has a tank for supplying a liquid to be dispersed to the dispersing device main body through piping and a tank for receiving the liquid to be dispersed. The system causes the liquid to pass through the dispersing device main body. In the circulation dispersion system, the liquid to be dispersed which has passed through the dispersing device main body is returned to the tank for supplying the liquid to be dispersed, and dispersion is performed while performing circulation. In all of the systems, the dispersing proceeds as the processing time is increased. Therefore, it is sufficient if the passing or circulation is repeated until the desired dispersion state is reached. The processing amount can be increased if the size of the tank or the processing time is changed. The pass type dispersion system is more preferable than the circulation dispersion system because the pass type dispersion system can make the dispersion state uniform easily. The circulation dispersion system is more preferable than the pass type dispersion system because the work and manufacturing equipment are simple. In the dispersion process, the crushing of the aggregated particles, the unraveling, wetting, stabilization, and the like of the CNT proceed sequentially or simultaneously. The finished dispersion state differs depending on the progress method. Therefore, it is preferable to manage the dispersion state in each dispersion process by using various evaluation methods. The states can be managed based on the method described in the examples.

<Composition for Secondary Battery Electrode>

A composition for the secondary battery electrode contains at least the conductive material dispersion, may contain a binder resin, and any component may be further mixed thereto. The composition for the secondary battery electrode contains water and may optionally contain a water-soluble solvent which is exemplified as a dispersion medium.

[Binder Resin]

Suppose that the composition for the secondary battery electrode further contains a binder resin. In the above case, there are no particular limitations as long as the resin is normally used as a binder resin for coating materials, and the resin can be appropriately selected depending on the purpose. The binder resin used in the composition for the secondary battery electrode is a resin capable of bonding between materials such as an active material, CNT, carbon black, or other conductive material. The CMC may be a CMC having a different molecular weight, etherification degree, or the like from the CMC contained in the conductive material dispersion. Examples of the binder resin used in the composition for the secondary battery electrode include a polymer or copolymer containing, as constituent units, ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, and vinyl pyrrolidone; a polyurethane resin, a polyester resin, a phenolic resin, an epoxy resin, a phenoxy resin, an urea resin, a melamine resin, an alkyd resin, an acrylic resin, a formaldehyde resin, a silicon resin, and a fluororesin; a cellulose resin; elastomers such as a styrene-butadiene rubber and a fluororubber; and conductive resins such as polyaniline and polyacetylene. A modified product or mixture of these resins and a copolymer may also be used. Among these, when the resin is used as a positive electrode binder resin, a polymer or copolymer having a fluorine atom in a molecule, for example, polyvinylidene fluoride, polyvinyl fluoride, tetrafluoroethylene, or the like is preferable from the viewpoint of resistance. When the resin is used as a negative electrode binder resin, CMC having good adhesion (however, CMC having a different molecular weight, etherification degree, and the like from the CMC contained in the conductive material dispersion), a styrene-butadiene rubber, polyacrylic acid or the like is preferable.

The content of the binder resin used in the composition for the secondary battery electrode is preferably 0.5 to 30 mass % and more preferably 0.5 to 25 mass % of the non-volatile content of the composition for the secondary battery electrode.

The composition for the secondary battery electrode may contain a positive electrode active material or a negative electrode active material. In the present specification, the positive electrode active material and the negative electrode active material may be simply referred to as an "active material". An active material is a material which serves as a basis of a battery reaction. The active material is divided into a positive electrode active material and a negative electrode active material from the electromotive force. In the present specification, the composition for the secondary battery electrode containing the positive electrode active material or the negative electrode active material may be referred to as a "positive electrode mixture composition", a "negative electrode mixture composition" or simply a "mixture composition". The mixture composition is preferably a slurry in order to enhance uniformity and processability. The mixture composition contains at least a conductive material dispersion and an active material and may further contain a binder resin.

[Positive Electrode Active Material]

The positive electrode active material is not particularly limited, but if the material is used for a secondary battery, the material can be used as a metal compound such as a metal oxide and a metal sulfide capable of reversibly doping or intercalating lithium ions, for example. Examples of the positive electrode active material include composite oxide powders of transition metals and lithium such as lithium manganese complex oxides (for example, $Li_xMn_2O_4$ or $Li_xMnO_2$), lithium nickel complex oxides (for example, $Li_xNiO_2$), lithium cobalt complex oxides (for example, $Li_xCoO_2$), lithium nickel cobalt complex oxides (for example, $Li_xNi_{1-y}Co_yO_2$), lithium manganese cobalt complex oxides (for example, $Li_xMn_yCo_{1-y}O_2$), lithium nickel manganese cobalt complex oxides (for example, $Li_xNi_y$-$Co_zMn_{1-y-z}O_2$), and spinel-type lithium manganese nickel composite oxides (for example, $Li_xMn_{2-y}Ni_yO_4$); lithium phosphate powders having olivine structures (for example, $Li_xFePO_4$, $Li_xFe_{1-y}Mn_yPO_4$, $Li_xCoPO_4$, and the like); transition metal oxide powders such as manganese oxide, iron oxide, copper oxide, nickel oxide, vanadium oxide (for example, $V_2O_5$, $V_6O_{13}$) and titanium oxide; and transition metal sulfide powders such as iron sulfate ($Fe_2(SO_4)_3$), $TiS_2$, and FeS. The x, y, and z indicate numbers, and the following relationships hold: $0<x<1$, $0<y<1$, $0<z<1$, $0<y+z<1$. One or more of the above may be used in combination as the positive electrode active material.

[Negative Electrode Active Material]

The negative electrode active material is not particularly limited. However, examples of the negative electrode active material include metal oxide systems such as metal Li or an alloy thereof, a tin alloy, a silicon alloy negative electrode, $Li_xTiO_2$, $Li_xFe_2O_3$, $Li_xFe_3O_4$, $Li_xWO_2$ capable of reversibly doping or intercalating lithium ions; a conductive polymer such as polyacetylene or poly-p-phenylene; artificial graphite such as a high graphitized carbon material; a carbonaceous powder such as natural graphite; or a resin-fired carbon material. The x indicates a number and $0<x<1$ holds. One or more of the above may be used in combination as the negative electrode active material. In particular, if the silicon alloy negative electrode is used, it is preferable to use the silicon alloy negative electrode in combination with artificial graphite such as a high graphitized carbon material, carbonaceous powder such as natural graphite, resin-fired carbon material, and the like because the volume expansion is extremely large while the theoretical capacity is large.

The content of the conductive material in the mixture composition is preferably 0.01 mass % or more, more preferably 0.02 mass % or more, and still more preferably 0.03 mass % or more relative to the mass of the active material (by assuming that the mass of the active material is 100 mass %). Further, the content is preferably 10 mass % or less, more preferably 5 mass % or less, and still more preferably 3 mass % or less.

The content of the dispersing agent in the mixture composition is preferably 0.01 mass % or more and more preferably 0.02 mass % or more relative to the mass of the active material (by assuming that the mass of the active material is 100 mass %). The content is preferably 10 mass % or less and more preferably 5 mass % or less.

Suppose that the mixture composition contains the binder resin. In the above case, the content of the binder resin in the mixture composition is preferably 0.5 mass % or more relative to the mass of the active material (by assuming that the mass of the active material is 100 mass %). Further, the content is preferably 30 mass % or less, more preferably 25 mass % or less, and still more preferably 20 mass % or less.

The solid content of the mixture composition is preferably 30 mass % or more and more preferably 40 mass % or more relative to the mass of the mixture composition (by assuming that the mass of the mixture composition is 100 mass %). The solid content is preferably 90 mass % or less and more preferably 80 mass % or less.

The mixture composition can be prepared by means of various conventionally known methods. Examples of the various methods include a method for preparing the composition by adding the active material to the conductive material dispersion; a method for preparing the composition by adding the active material to the conductive material dispersion and then adding the binder resin thereto; and a method for preparing the composition by adding the binder resin to the conductive material dispersion and then adding the active material thereto. As the method for preparing the mixture composition, a method including the dispersion process is preferable. In the method, the binder resin is added to the conductive material dispersion, and then the active material is further added thereto. The dispersing device used for the dispersion is not particularly limited. The mixture composition can be obtained by using the dispersion means cited in the description of the conductive material dispersion. Therefore, in the method for preparing the mixture composition, the dispersion process may be performed by adding an electrode active material without adding the binder resin to the conductive material dispersion.

<Electrode Film>

The electrode film includes at least one selected from the group consisting of a film formed by using the conductive material dispersion and a film formed by using the composition for the secondary battery electrode. The electrode film may further include a current collector. The electrode film can be obtained by coating the composition for the secondary battery electrode on the current collector and drying, for example. The electrode film includes the current collector and the film. An electrode film formed by using the positive electrode mixture composition can be used as a positive electrode. An electrode film formed by using the negative electrode mixture composition can be used as a negative electrode. In the present specification, a film formed by using the composition for the secondary battery electrode containing the active material may be referred to as an "electrode mixture layer".

The material and shape of the current collector used for forming the electrode film are not particularly limited, and those suitable for various types of secondary batteries can be appropriately selected. Examples of the material of the current collector include a conductive metal such as aluminum, copper, nickel, titanium, or stainless steel or an alloy of a conductive metal. With respect to the shape of the current collector, a flat foil is generally used. However, a current collector having a roughened surface, a holed foil current collector, or a mesh current collector can also be used. The current collector preferably has a thickness of about 0.5 to 30 μm.

There are no particular limitations regarding the method for coating the conductive material dispersion or the composition for the secondary battery electrode on the current collector, and a known method can be used. Specifically, examples of the method include a die coating method, a dip coating method, a roll coating method, a doctor coating method, a knife coating method, a spray coating method, a gravure coating method, a screen printing method, an electrostatic coating method, or the like. Examples of drying methods include standing drying or drying using a fan dryer, a hot air dryer, an infrared heater, a far-infrared heater, or the like, but the drying methods are not limited to the above.

After performing coating, a rolling process may be performed by means of a planographic press, a calendar roll, or the like. The thickness of the formed film is 1 μm or more and 500 μm or less and preferably 10 μm or more and 300 μm or less, for example.

The film formed by using the conductive material dispersion or the composition for the secondary battery electrode can be used as a base layer of the electrode mixture layer in order to enhance the adhesion between the electrode mixture layer and the current collector or to enhance the conductivity of the electrode film.

<Secondary Battery>

The secondary battery includes a positive electrode, a negative electrode, and an electrolyte. At least one selected from the group consisting of the positive electrode and the negative electrode includes an electrode film.

As the electrolyte, various conventionally known electrolytes in which ions can move can be used. Examples of the electrolyte include, but are not limited to, electrolytes containing lithium salts such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, $LiAlCl$, $LiHF_2$, LiSCN, or $LiBPh_4$ (where Ph is a phenyl group). The electrolyte is preferably dissolved in a nonaqueous solvent and used as an electrolyte.

Examples of the nonaqueous solvent includes carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethylsulfoxide and sulfolane; nitriles such as acetonitrile, and the like, but the nonaqueous solvent is not particularly limited. Each of these solvents may be used alone or two or more solvents may be used in combination.

A secondary battery (a nonaqueous electrolyte secondary battery) containing a nonaqueous electrolyte solution preferably contains a separator. The nonaqueous electrolyte solution is obtained by dissolving an electrolyte in a nonaqueous solvent. Examples of the separator include, but are not limited to, a polyethylene nonwoven fabric, a polypropylene nonwoven fabric, a polyamide nonwoven fabric, and nonwoven fabrics obtained by subjecting the above nonwoven fabrics to a hydrophilic treatment.

The structure of the nonaqueous electrolyte secondary battery is not particularly limited, but usually a nonaqueous electrolyte secondary battery includes a positive electrode, a negative electrode, and a separator which is provided as needed. The nonaqueous electrolyte secondary battery can be formed into various shapes depending on the purpose of use, such as a paper type, a cylindrical type, a button type, and a laminated type.

<Vehicle>

A vehicle includes a secondary battery. The secondary battery can be used as a power source for driving vehicles such as a private car, a bus, a truck, and a train. The secondary battery can be mounted on a hybrid vehicle, an electric vehicle, and the like.

The present invention relates to the subject matter of Japanese Patent Application No. 2020-078026, filed on Apr. 27, 2020 and Japanese Patent Application No. 2020-205488, filed on Dec. 11, 2020, the entire disclosures of which are incorporated herein by reference.

EXAMPLES

The present invention will be described in more detail with reference to the following examples. The present invention is not limited to the following examples provided that the gist of the present invention is not exceeded. Unless otherwise specified, "part" represents "parts by mass" and "%" represents "mass %".

(Method for Measuring Weight Average Molecular Weight (Mw))

The weight average molecular weight (Mw) of the produced carboxymethyl cellulose sodium salt was measured by using gel permeation chromatography (GPC) having an RI detector under the following conditions. The molecular weight is the pullulan equivalent value.

Measured sample: 0.1 mass % of aqueous solution
    Device: HLC-8320GPC (manufactured by TOSOH CORPORATION)
    Eluent: 0.1 M NaCl aqueous solution
    Column: TSKgel SuperMultipore PW-M (manufactured by TOSOH CORPORATION)
    Flow rate: 1.0 mL/min
    Temperature: 25° C.
    Injection volume: 100 μl (Method for Measuring Etherification Degree)

An amount of 0.6 g of carboxymethyl cellulose sodium salt was dried at 105° C. for 4 hours. After the mass of the dried material was weighed, the dried material was wrapped in a filter paper and incinerated in a porcelain crucible. The ash was moved to a 500 ml beaker. Amounts of 250 ml of water and 35 ml of 0.05 mol/1 aqueous sulfuric acid solution were added to the ash and the mixture was boiled for 30 minutes. After cooling the mixture, the excess acid was back-titrated by using 0.1 mol/1 of aqueous potassium hydroxide solution. Phenolphthalein was used as an indicator. The etherification degree was calculated from the following Formula 1 by using the measured results.

$$\text{(Etherification degree)} = 162A/(10{,}000 - 80A) \quad \text{(Formula 1)}$$

A=(af−bf$_1$)/weight of dried material (g)
A: Amount (ml) of 0.05 mol/l aqueous sulfuric acid solution consumed for binding with alkali in 1 g of sample
a: Amount (ml) of 0.05 mol/l aqueous sulfuric acid solution used
f: Potency of 0.05 mol/l aqueous sulfuric acid solution
b: Titration of 0.1 mol/l aqueous potassium hydroxide solution (ml)
f$_1$: Potency of 0.1 mol/l aqueous potassium hydroxide solution (Preparation of Carboxymethyl Cellulose Sodium Salt)

Production Example 1

An amount of 10 parts by mass of a low-density pulp pulverized by using a household mixer was charged into a tank of a planetary mixer (HIVIS DISPER MIX Model 3D-2 manufactured by PRIMIX Corporation). Subsequently, 90 parts by mass of 15 mass % sodium hydroxide/IPA/aqueous solution (the mass ratio of IPA:water is 80:20) was put into the tank, stirred at 40° C. for 150 minutes, and a mercerization reaction was performed to obtain alkali cellulose. Next, 10 parts by mass of monochloroacetic acid was dissolved in 6 parts by mass of the sodium hydroxide/IPA/aqueous solution. After the temperature was adjusted to 25° C., alkali cellulose was added over 60 minutes while maintaining the temperature at 35° C., then the temperature was raised to 80° C. over 30 minutes, and an etherification reaction was performed at 80° C. for 50 minutes. Subsequently, neutralization was performed with 50 mass % of acetic acid and a pH of 7.0 was obtained.

The solid component of the neutralized product was separated by using a Buchner funnel. Subsequently, 70 mass % aqueous methanol solution was sprinkled on the solid component on the Buchner funnel for washing, and salt, sodium glycolate, and sodium acetate as side products were removed. The product was moved to a stainless steel square tray, dried in a hot air oven at 90° C. for 4 hours, and pulverized. Accordingly, carboxymethyl cellulose sodium salt (CMC 1) was obtained. The weight average molecular weight and the etherification degree of the carboxymethyl cellulose sodium salt obtained were as shown in Table 1.

Production Examples 2 and 3

Carboxymethyl cellulose sodium salts (CMC2 and CMC3) were obtained in the same manner as in Production Example 1 except that the reaction times of the mercerization step and the etherification step were changed to the times shown in Table 1. The weight average molecular weight and the etherification degree of the carboxymethyl cellulose sodium salt obtained were as shown in Table 1.
[Table 1]

(Method for Measuring Amount of Acidic Group in CNT)

The amount of acidic group in the CNT was obtained and calculated as follows by means of back titration from the adsorbed amount of the hexylamine. An amount of 0.2 g of the CNT was collected in a glass bottle (M-70 manufactured by HAKUYO GLASS Co., Ltd.) and 30 ml of hexylamine/NMP solution (0.02 mol/l) was added thereto. The glass bottle was irradiated with ultrasonic waves (frequency: 28 Hz) for 1 hour, and coarse grains were removed by using a nylon mesh having a mesh opening of 25 μm. Further, centrifugation was performed at 10,000 rpm for 10 minutes by using a centrifuge (mini-centrifuge MCF-1350 (manufactured by LMS)), the supernatant was collected, the filtration was performed by using a membrane filter (filter pore size: 0.22 μm), and the filtrate was collected. An amount of 10 ml of the obtained filtrate was collected and diluted with 40 ml of ion-exchanged water to obtain the titrant. In addition, 10 ml of the hexylamine/NMP solution (0.02 mol/l) not subjected to ultrasonic treatment was diluted with 40 ml of ion-exchanged water together with the CNT to obtain a standard titrant. Each of the titrant and the standard titrant was titrated separately with 0.1 mol/l HCl/ethanol solution by using an automatic potentiometric titrator (AT-710S manufactured by KYOTO ELECTRONICS MANUFACTURING CO., LTD.). The amount of hexylamine adsorbed on the CNT ([hexylamine adsorbed amount] (μmol)) was calculated from the difference in the titration amount at the isoelectric point. With respect to the titrant, 10 ml of the 30 ml hexylamine/NMP solution was collected and the CNT mass was 0.2 g. Therefore, a value obtained by multiplying the [hexylamine adsorbed amount] by 3 and then dividing the resultant value by 0.2 is the [hexylamine adsorbed amount] per unit weight of the conductive material (μmol/g). Further, a value obtained by dividing the value by the specific surface area of the CNT is the [hexylamine adsorbed amount] per CNT surface area (μmol/m$^2$).

(Method for Measuring Specific Surface Area of Conductive Material)

After weighing 0.03 g of the conductive material by using an electronic balance (MSA225S100DI manufactured by Sartorius), the conductive material was dried at 110° C. for 15 minutes while degassing. Thereafter, the specific surface area (m$^2$/g) of the conductive material was measured by using a fully automatic specific surface area analyzer (HM-model 1208 manufactured by MOUNTECH).

(Method for Measuring G/D Ratio of Conductive Material)

The conductive material was placed on a Raman microscope (XploRA manufactured by Horiba Seisakusho Co., Ltd.) and the conductive material was measured by using a laser wavelength of 532 nm. The measurement conditions were a capture time of 60 seconds, an integration frequency of 2 times, a dimming filter of 10%, a magnification of the objective lens of 20 times, a focus hole of 500, a slit width

TABLE 1

|  | CMC or its salt | Mercerization step Reaction time (min) | Etherification step Reaction time (min) | Weight average molecular weight | Etherification degree |
|---|---|---|---|---|---|
| Production Example 1 | CMC 1 | 150 | 50 | 11,000 | 0.71 |
| Production Example 2 | CMC 2 | 120 | 50 | 24,000 | 0.67 |
| Production Example 3 | CMC 3 | 50 | 70 | 70,000 | 0.75 | of 100 µm, and a measurement wavelength of 100 to 3000 cm$^{-1}$. The conductive material for measurement was separated onto a glass slide and flattened by using a spatula. The G/D ratio of the conductive material was measured with G being the maximum peak intensity in the range of 1560 to 1600 cm$^{-1}$ in the spectrum and D being the maximum peak intensity in the range of 1310 to 1350 cm$^{-1}$ in the spectrum.

(Method for Measuring Dispersion Grain Size)

The dispersion grain size was obtained based on a determination method in accordance with JIS K5600-2-5 using a grind gauge having a maximum groove depth of 300 µm.

(Method for Measuring Glossiness)

A sample for gloss measurement was obtained by adding 1 mL of a conductive material dispersion onto a smooth glass substrate, performing coating by using a No. 7 bar coater at 2 cm/sec, baking in a hot air oven at 140° C. for 10 minutes, and cooling. The coating area was set to about 10 cm×10 cm. By using a gloss meter (gloss meter, micro-gross 60° manufactured by BYK Gardner), three locations on the surface of the coating film except the end parts were selected at random and the average value obtained by measuring each of the three locations once was used as the gloss at 60 degrees.

(Method for Measuring Particle Size of Median Diameter of Conductive Material Dispersion)

The median diameter was measured by using a particle size distribution measuring device (Partical LA-960V2, manufactured by HORIBA). Circulation/ultrasonic wave operating conditions were as follows: circulation speed: 3, ultrasonic intensity: 7, ultrasonic time: 1 minute, stirring speed: 1, and stirring mode: continuous. During air venting, ultrasonic operation was performed at an ultrasonic intensity of 7 and an ultrasonic time of 5 seconds. The refractive index of water was set at 1.333 and the refractive index of the carbon material was set at 1.92. The measurement was performed after diluting the measurement sample such that the transmittance of the red laser diode was 60 to 80%, and the particle size reference was the volume.

(Method for Measuring Viscosity of Conductive Material Dispersion)

The viscosity of the conductive material dispersion was measured by using a B-type viscometer ("BL" manufactured by TOKI SANGYO Co., Ltd.) at a rotor speed of 6 rpm immediately after sufficiently stirring the dispersion element with a spatula at a dispersion temperature of 25° C. by using the B-type viscometer, and then the viscosity was continuously measured at 60 rpm. The lower the viscosity, the better the dispersibility, and the higher the viscosity, the poorer the dispersibility. A clearly separated or precipitated dispersion element was regarded to have poor dispersibility. A TI value was obtained from a value obtained by dividing the viscosity (mPa·s) at 60 rpm by the viscosity (mPa·s) at 6 rpm. The viscosity of the conductive material dispersion is excellent if the viscosity is less than 500 mPa·s, good if the viscosity is 500 mPa·s or more and less than 2,000 mPa·s, bad if the viscosity is 2,000 mPa·s or more and less than 10,000 mPa·s, and extremely bad if the viscosity is 10,000 mPa·s or more and if precipitation or separation occurs.

(Measurement of Complex Elastic Modulus and Phase Angle of Conductive Material Dispersion)

The complex elastic modulus X and the phase angle Y of the conductive material dispersion were evaluated by performing a dynamic viscoelastic measurement in the range of a strain rate of 0.01% to 5% at 25° C. and a frequency of 1 Hz by using a rheometer (RheoStress 1 rotary rheometer manufactured by Thermo Fisher Scientific Co., Ltd.) with a 2° cone having a diameter of 35 mm. The smaller the complex elastic modulus, the better the dispersibility, and the larger the complex elastic modulus, the worse the dispersibility. The larger the obtained phase angle, the better the dispersibility, and the smaller the phase angle, the worse the dispersibility. Further, the product (X×Y) of the obtained complex elastic modulus X (Pa) and phase angle Y (°) was calculated.

(Method for Measuring pH of Conductive Material Dispersion)

The pH of the conductive material dispersion was measured at 25° C. by using a desktop pH meter (SevenCompact S220 Expert Pro, manufactured by METTLER TOLEDO.).

(Method for Evaluating Stability of Conductive Material Dispersion)

The storage stability was evaluated by measuring the viscosity of the dispersion element after storage of the element at 50° C. for 7 days. The measurement method was the same as that for the initial viscosity.

Determination criteria
A: equivalent to initial viscosity (excellent)
B: viscosity slightly changed (good)
C: viscosity increased but not gelled (possible)
E: gelled (extremely poor)

(Preparation of Conductive Material Dispersion)

The abbreviations described in the following description are as follows.

10B: JENOTUBE10B (multi-walled CNT manufactured by JEIO, outer diameter 7 to 12 nm, average outer diameter 8.8 nm, specific surface area 230 m$^2$/g, amount of acid group 0.67 µmol/m$^2$, 154 µmol/g, G/D ratio 0.80)

6A: JENOTUBE6A (multi-walled CNT manufactured by JEIO, outer diameter 5 to 7 nm, average outer diameter 6.9 nm, specific surface area 700 m$^2$/g, amount of acid group 0.27 µmol/m$^2$, 190 µmol/g, G/D ratio 0.80)

TUBALL1: Single wall carbon nanotube (manufactured by OCSiA1, outer diameter 1.3 to 2.3 nm, average outer diameter 1.8 nm, purity 80%, specific surface area 490 m$^2$/g, amount of acid group 0.38 µmol/m$^2$, 186 µmol/g, G/D ratio 39.1)

TUBALL2: Single wall carbon nanotube (manufactured by OCSiA1, outer diameter 1.2 to 2.0 nm, average outer diameter 1.5 nm, purity 93%, specific surface area 975 m$^2$/g, amount of acid group 0.21 µmol/m$^2$, 205 µmol/g, G/D ratio 41.7)

TNSR: Single wall carbon nanotube (manufactured by Timesnano, outer diameter 1.0 to 2.0 nm, average outer diameter 1.6 nm, specific surface area 610 m$^2$/g, amount of acid group 0.79 µmol/m$^2$, 480 µmol/g, G/D ratio 27.8)

TNSAR: Single wall carbon nanotube (manufactured by Timesnano, outer diameter 1.0 to 2.0 nm, average outer diameter 1.3 nm, specific surface area 950 m$^2$/g, amount of acid group 0.31 µmol/m$^2$, 290 µmol/g, G/D ratio 36.4)

EC-300J: Ketjen black (manufactured by Lion Specialty Chemicals Co., Ltd., average primary particle diameter 40 nm, specific surface area 800 m$^2$/g, amount of acid group 0.27 µmol/m$^2$, 219 µmol/g)

HS-100: Denka black HS-100 (manufactured by Denka Company Limited. Company Limited., acetylene black, average primary particle diameter 48 nm, specific surface area 39 m$^2$/g, amount of acid group 0.21 µmol/m$^2$, 205 µmol/g)

LITX200: LITX® 200 (manufactured by CABOT CORPORATION., furnace black, specific surface area 130 m$^2$/g)

LITXHP: LITX® HP (manufactured by CABOT CORPORATION., furnace black, Specific surface area 100 m$^2$/g)

FX-35: Denka black FX-35 (manufactured by Denka Company Limited., acetylene black, specific surface area 133 m²/g)
APP-84: carboxymethyl cellulose sodium salt, manufactured by NIPPON PAPER INDUSTRIES CO., LTD., SUNROSE A APP-84
F01MC: carboxymethyl cellulose sodium salt, manufactured by NIPPON PAPER INDUSTRIES CO., LTD., SUNROSE F F01MC
F04HC: carboxymethyl cellulose sodium salt, manufactured by NIPPON PAPER INDUSTRIES CO., LTD., SUNROSE F F04MC
A02SH: carboxymethyl cellulose sodium salt, manufactured by NIPPON PAPER INDUSTRIES CO., LTD., SUNROSE A02SH
F10LC: carboxymethyl cellulose sodium salt, manufactured by NIPPON PAPER INDUSTRIES CO., LTD., SUNROSE F F10LC
F10MC: carboxymethyl cellulose sodium salt, manufactured by NIPPON PAPER INDUSTRIES CO., LTD., SUNROSE F F10MC
F30MC: carboxymethyl cellulose sodium salt, manufactured by NIPPON PAPER INDUSTRIES CO., LTD., SUNROSE F F30MC
MAC500LC: carboxymethyl cellulose sodium salt, manufactured by NIPPON PAPER INDUSTRIES CO., LTD., SUNROSE Special Type MAC500LC
CELLOGEN 5A: carboxymethyl cellulose sodium salt, manufactured by DKS Co., Ltd.
CELLOGEN 6A: carboxymethyl cellulose sodium salt, manufactured by DKS Co., Ltd.
PAA: polyacrylic acid, manufactured by Wako Pure Chemical Industries, Ltd., average molecular weight 25,000
AC-10P: polyacrylic acid, manufactured by TOAGOSEI CO., LTD., average molecular weight 9,000
AC-10LP: polyacrylic acid, manufactured by TOAGOSEI CO., LTD., average molecular weight 50,000
HL415: polyacrylic acid, manufactured by Nippon Shokubai, Co., Ltd., Aqualic, average molecular weight 10,000, NV 45%

Example 1-A1)

An amount of 93.7 parts by mass of ion-exchanged water was added to a stainless steel container, and 1.25 parts by mass of APP-84 (CMC) was added and dissolved in the water while stirring the water with a disper mixer. Thereafter, 2.0 parts by mass of 10B (CNT) was added to the water while stirring the water with the disper mixer. A square hole high-shear screen was attached to a high-shear mixer (L5M-A, manufactured by SILVERSON), and batch type dispersion was performed at a speed of 8,600 rpm until the entirety became uniform and the dispersion grain size became 250 µm or less by means of a grind gauge. At this time, the dispersion grain size confirmed by using the grind gauge was 180 µm. Subsequently, the liquid to be dispersed was supplied from the stainless steel container to a high-pressure homogenizer (Star Burst Labo HJP-17007, manufactured by SUGINO MACHINE LIMITED.) through piping, and a circulation dispersion treatment was performed. The dispersion treatment was performed by using a single nozzle chamber with a nozzle diameter of 0.25 mm and at a pressure of 100 MPa. After performing dispersing until the viscosity at 60 rpm measured by using a B-type viscometer (VISCOMETER, MODEL: BL manufactured by TOKI SANGYO CO., LTD.) became 3,000 mPa·s or less, 0.5 parts by mass of 10B was further added to the stainless steel container while stirring the mixture with the disper mixer, and a circulation dispersion treatment was performed again by using a high-pressure homogenizer. After performing circulation dispersion by means of a high-pressure homogenizer until the viscosity became 3,000 mPa·s or less, the work of adding 10B to the stainless steel container while stirring the mixture by using the disper mixer was repeated six times in total (the total amount of 10B added was 5.0 parts by mass). Subsequently, a conductive material dispersion (CNT dispersion A1) containing 5.0 parts by mass of the CNT was obtained by performing a pass type dispersion treatment ten times by using the high-pressure homogenizer.

Examples 1-A2 and 1-A3

Conductive material dispersions (CNT dispersions A2 and A3) were obtained in the same manner as in Example 1-A1 except that the number of times the pass type dispersion is performed was changed to 20 times and 30 times.

Examples 1-A4 to 1-A12 and 1-A17 to 1-A20)

Conductive material dispersions (CNT dispersions A4 to A20) were obtained in the same manner as in Example 1-1A except that the material, composition ratio, and the number of times the pass type dispersion is performed shown in Table 3 were changed.

Comparative Examples 1-a1 to 1-a14

Conductive material dispersions (CNT dispersions a1 to a14) were obtained in the same manner as in Example 1-1A except that the material, composition ratio, and the number of times the pass type dispersion is performed shown in Table 4 were changed.

Example 1-A13

The conductive material dispersion (a CNT dispersion A3) obtained in Example 1-A3 was introduced into a stainless steel container, and 0.004 parts by mass of PAA was added while stirring the mixture with a disper mixer, and accordingly a conductive material dispersion (a CNT dispersion A13) containing 5.0 parts by mass of the CNT was obtained. The pH of CNT dispersion A13 was 7.5.

Example 1-A14

A conductive material dispersion (a conductive material dispersion A14) was obtained by means of the same method as in Example 1-A13 except that PAA was changed to AC-10P. The pH of the CNT dispersion A14 was 7.1.

Example 1-A15

A conductive material dispersion (a CNT dispersion A15) was obtained by means of the same method as in Example 1-A13 except that PAA was changed to AC-10 LP. The pH of the CNT dispersion A15 was 7.0.

Example 1-A16

A conductive material dispersion (a CNT dispersion A16) was obtained by means of the same method as in Example 1-A13 except that the PAA was changed to HL415. The pH of the CNT dispersion A16 was 7.5.

Example 1-A21

An amount of 98.05 parts by mass of ion-exchanged water was added to a stainless steel container, and 0.45 parts by mass of APP-084 (CMC) was added and dissolved in the water while stirring the water with a disper mixer. Thereafter, 0.115 parts by mass of TNSR (CNT) and 1.385 parts by mass of 10B (CNT) were added to the water while stirring the water with the disper mixer. A square hole high-shear screen was attached to a high-shear mixer (L5M-A, manufactured by SILVERSON) and batch type dispersion was performed at a speed of 8,600 rpm until the entirety became uniform and the dispersion grain size became 250 µm or less by using a grind gauge. Subsequently, the liquid to be dispersed was supplied from the stainless steel container to a high-pressure homogenizer (Star Burst Labo HJP-17007, manufactured by SUGINO MACHINE LIMITED.) via piping, and a pass type dispersion treatment was performed 20 times. The dispersion treatment was performed by using a single nozzle chamber with a nozzle diameter of 0.25 mm at a pressure of 100 MPa, and accordingly a conductive material dispersion (a CNT dispersion A21) containing 1.5 parts by mass of the CNT was obtained. The CNT mass ratio of TNSR to 10B was 1:12.

Example 1-A22

A conductive material dispersion (a CNT dispersion A22) containing 2.5 parts by mass of the CNT was obtained by means of the same method as in Example 1-A21 except that the addition amount of ion-exchanged water was changed from 98.05 parts by mass to 96.75 parts by mass, the addition amount of APP-084 was changed from 0.45 parts by mass to 0.75 parts by mass, the addition amount of 10B was changed from 1.385 parts by mass to 2.4 parts by mass, and the addition amount of TNSR was changed from 0.115 parts by mass to 0.1 parts by mass. The CNT mass ratio of the TNSR to 10B was 1:24.

Example 1-A23

An amount of 98.64 parts by mass of ion-exchanged water was added to a stainless steel container and 0.56 parts by mass of APP-084 (CMC) was added and dissolved in the water while stirring the water with a disper mixer. Thereafter, 0.062 parts by mass of TNSR (CNT) and 0.738 parts by mass of 6A (CNT) were added to the water while stirring the water with the disper mixer. A square hole high-shear screen was attached to a high-shear mixer (L5M-A, manufactured by SILVERSON) and batch type dispersion was performed at a speed of 8,600 rpm until the entirety became uniform and the dispersion grain size became 250 µm or less by means of a grind gauge. Subsequently, the liquid to be dispersed was supplied from the stainless steel container to a high-pressure homogenizer (Star Burst Labo HJP-17007, manufactured by SUGINO MACHINE LIMITED.) via piping, and the pass type dispersion treatment was performed 20 times. The dispersion treatment was performed by using a single nozzle chamber with a nozzle diameter of 0.25 mm at a pressure of 100 MPa, and accordingly a conductive material dispersion (a CNT dispersion A23) containing 1.0 parts by mass of the CNT was obtained. The CNT mass ratio of TNSR to 6A was 1:12.

Example 1-A24

A conductive material dispersion (a CNT dispersion A24) containing 2.5 parts by mass of the CNT was obtained by means of the same method as in Example 1-A23 except that the addition amount of ion-exchanged water was changed from 98.64 parts by mass to 98.3 parts by mass, the addition amount of APP-084 was changed from 0.56 parts by mass to 0.70 parts by mass, the addition amount of 6A was changed from 0.738 parts by mass to 0.96 parts by mass, and the addition amount of TNSR was changed from 0.062 parts by mass to 0.04 parts by mass. The CNT mass ratio of TNSR to 6A was 1:24.

Example 1-A25

A conductive material dispersion (a CNT dispersion A25) containing 1.1 parts by mass of the CNT was obtained by means of the same method as in Example 1-A23 except that the addition amount of ion-exchanged water was changed from 98.64 parts by mass to 98.13 parts by mass, the addition amount of APP-084 was changed from 0.56 parts by mass to 0.77 parts by mass, the addition amount of 6A was changed from 0.738 parts by mass to 1.08 parts by mass, and the addition amount of TNSR was changed from 0.062 parts by mass to 0.02 parts by mass. The CNT mass ratio of TNSR to 6A was 1:48.

Comparative Example 1-A15

The conductive material dispersion (the CNT dispersion A3) obtained in Examples 1-A3 was introduced into a stainless steel container, and while stirring the dispersion with a disper mixer, 0.04 parts by mass of PAA relative to the mass of the CNT was added to the dispersion. Accordingly, a conductive material dispersion (a CNT dispersion a15) containing 5.0 parts by mass of the CNT was obtained. The pH of the CNT dispersion a15 was 5.5.

Comparative Example 1-A16 to 1-A17

Dispersions (CB Dispersions a1 to a2) were obtained in the same manner as in Example 1-1 A except that the material, composition ratio, and number of times the pass type dispersion is performed shown in Table 4 were changed.

Examples 1-B1 to 1-B3

An amount of 80 parts by mass of the conductive material dispersions (the CNT dispersions A1 to A3) obtained in Examples 1-A1 to 1-A3 was introduced into a glass bottle (M-140, manufactured by HAKUYO GLASS Co., Ltd.) and 140 parts by mass of zirconia beads (bead diameter 1.0 mmφ) was added. After performing dispersing for two hours by using a paint conditioner manufactured by Red Devil Equipment Co., the zirconia beads were separated, and conductive material dispersions (CNT dispersions B1 to B3) were obtained.

Example 1-B4

An amount of 80 parts by mass of the conductive material dispersion (CNT dispersion A3) obtained in Example 1-A3 was introduced into a glass bottle (M-140, manufactured by HAKUYO GLASS Co., Ltd.) and 0.012 parts by mass of MAC5OOLC and 140 parts by mass of zirconia beads (bead diameter 1.0 mmφ)) were added. After performing dispersing for 5 hours by using a paint conditioner manufactured by Red Devil Equipment Co., the zirconia beads were separated and a conductive material dispersion (conductive material dispersion B4) was obtained.

Examples 1-C1 to 1-C3

The conductive material dispersions obtained in Examples 1-A1 to 1-A3 (CNT dispersions A1 to A3) were introduced into a stainless steel container and diluted with ion-exchanged water while being stirred by using a disper mixer. Accordingly, conductive material dispersions (CNT dispersions C1 to C3) containing 2.0 parts by mass of the CNT were obtained.

Examples 1-D1 to 1-D3

Amounts of 2.0 parts by mass of 10B (CNT), 0.5 parts by mass of CMC shown in Table 3, 97.6 parts by mass of ion-exchanged water, and 140 parts by mass of zirconia beads (bead diameter 0.5 mmφ) were charged into a glass bottle (M-140, manufactured by HAKUYO GLASS Co., Ltd.). After performing dispersing for 4 hours by using a paint conditioner manufactured by Red Devil Equipment Co., the zirconia beads were separated and conductive material dispersions (CNT dispersions D1 to D3) were obtained.

Example 1-D4

An amount of 97.6 parts by mass of ion-exchanged water was added to a stainless steel container and 0.4 parts by mass of F10LC (CMC) was added and dissolved into the water while stirring the water by using a disper mixer. Thereafter, 1.5 parts by mass of 10B (CNT) was added while stirring the mixture with the disper mixer. A square hole high-shear screen was attached to a high-shear mixer (L5M-A, manufactured by SILVERSON) and batch type dispersion was performed at a speed of 8,600 rpm until the entirety became uniform and the dispersion grain size became 250 μm or less by means of a grind gauge. The dispersion was performed until the viscosity at 60 rpm as measured by using a B-type viscometer (VISCOMETER, MODEL: BL manufactured by TOKI SANGYO CO., LTD.,) of the liquid to be dispersed was 3,000 mPa·s or less. Thereafter, 0.5 parts by mass of 10B was further added to the stainless steel container while stirring the mixture with the disper mixer and a pass type dispersion treatment was performed ten times with a high-pressure homogenizer. Accordingly, a conductive material dispersion (a CNT dispersion D4) containing 2.0 parts by mass of the CNT was obtained.

Example 1-E1

An amount of 83.5 parts by mass of ion-exchanged water was added to a stainless steel container and 1.5 parts by mass of APP-84 (CMC) was added and dissolved into the water while stirring the water with a disper mixer. Thereafter, 10 parts by mass of LITX200 (furnace black) was added to the mixture while stirring the mixture with the disper mixer. A square hole high-shear screen was attached to a high-shear mixer (L5M-A, manufactured by SILVERS ON) and batch type dispersion was performed at a speed of 8,600 rpm until the entirety became uniform and the dispersion grain size became 250 μm or less by means of a grind gauge. Subsequently, the liquid to be dispersed was supplied from the stainless steel container to a high-pressure homogenizer (Star Burst Labo HJP-17007, manufactured by SUGINO MACHINE LIMITED.) through piping and a circulation dispersion treatment was performed. The dispersion treatment was performed by using a single nozzle chamber with a nozzle diameter of 0.25 mm at a pressure of 100 MPa. After performing dispersing until the viscosity at 60 rpm measured by using a B-type viscometer of the liquid to be dispersed (VISCOMETER, MODEL: BL manufactured by TOKI SANGYO CO., LTD.) was 1,000 mPa·s or less, 1 part by mass of LITX200 was further added to the stainless steel container while stirring the mixture with the disper mixer and a circulation dispersion treatment was performed again by using the high-pressure homogenizer. After performing circulation dispersion by using the high-pressure homogenizer until the viscosity became 1,000 mPa·s or less, the work of adding LITX200 to the stainless steel container while stirring the mixture by using the disper mixer was repeated 5 times in total (the total amount of LITX200 added was 15 parts by mass). Subsequently, the pass type dispersion treatment was performed 3 times by using the high-pressure homogenizer, and accordingly a conductive material dispersion (CB Dispersion E1) containing 15 parts by mass of LITX200 was obtained.

Examples 1-E2 to 1-E3

Conductive material dispersions (CB Dispersions E2 to E3) were obtained in the same manner as in Examples 1-E1 except that the material was changed to the conductive material shown in Table 3.

Comparative Examples 1-d1 to 1-d3

Conductive material dispersions (CNT dispersions d1 to d3) were obtained in the same manner as in Examples 1-D1 except that the materials were changed to the materials shown in Table 4.

The weight average molecular weight and the etherification degree of carboxymethyl cellulose or its salt used in the examples and comparative examples were as shown in Table 2. The weight average molecular weight and the etherification degree were calculated based on the same measurement method as in the production example.

TABLE 2

| Commercially available CMC | Weight average molecular weight | Etherification degree |
|---|---|---|
| APP-84 | 18,000 | 0.71 |
| CELLOGEN 5A | 13,000 | 0.75 |
| CELLOGEN 6A | 23,000 | 0.73 |
| F01MC | 56,000 | 0.68 |
| F04HC | 68,000 | 0.93 |
| A02SH | 100,000 | 1.46 |
| F10LC | 123,000 | 0.60 |
| F10MC | 126,000 | 0.71 |
| F30MC | 149,000 | 0.69 |
| MAC500LC | 349,000 | 0.70 |

TABLE 3

| | Conductive material dispersion | Pass type Number of times (time) | Conductive material Type | Conductive material Amount added (Parts) | CMC Type | CMC Amount added to CNT (parts) | Initial viscocity 6 rpm (mPa·s) | Initial viscocity 60 rpm (mPa·s) | TI value |
|---|---|---|---|---|---|---|---|---|---|
| Example 1-A1 | CNT dispersion A1 | 10 | 10B | 5.0 | APP-084 | 20.0 | 30,000 | 6,100 | 4.92 |
| Example 1-A2 | CNT dispersion A2 | 20 | 10B | 5.0 | APP-084 | 20.0 | 12,200 | 2,800 | 4.36 |
| Example 1-A3 | CNT dispersion A3 | 30 | 10B | 5.0 | APP-084 | 20.0 | 12,900 | 2,400 | 5.38 |
| Example 1-A4 | CNT dispersion A4 | 10 | 6A | 1.2 | APP-084 | 62.5 | 22,000 | 4,800 | 4.58 |
| Example 1-A5 | CNT dispersion A5 | 20 | 6A | 1.2 | APP-084 | 62.5 | 5,500 | 1,460 | 3.77 |
| Example 1-A6 | CNT dispersion A6 | 30 | 6A | 1.2 | APP-084 | 62.5 | 2,900 | 860 | 3.37 |
| Example 1-A7 | CNT dispersion A7 | 20 | TUBALL 1 | 0.4 | APP-084 | 100.0 | 4,300 | 1,330 | 3.23 |
| Example 1-A8 | CNT dispersion A8 | 20 | TUBALL 2 | 0.4 | APP-084 | 100.0 | 5,200 | 1,780 | 2.92 |
| Example 1-A9 | CNT dispersion A9 | 10 | 10B | 5.0 | F01MC | 20.0 | 36,800 | 8,600 | 4.28 |
| Example 1-A10 | CNT dispersion A10 | 10 | 10B | 5.0 | CMC 1 | 20.0 | 24,500 | 5,100 | 4.80 |
| Example 1-A11 | CNT dispersion A11 | 10 | 10B | 5.0 | CMC 2 | 20.0 | 33,500 | 6,780 | 4.95 |
| Example 1-A12 | CNT dispersion A12 | 10 | 10B | 5.0 | CMC 3 | 20.0 | 42,500 | 8,800 | 4.34 |
| Example 1-A13 | CNT dispersion A13 | 30 | 10B | 5.0 | CMC 3 | 20.0 | 13,000 | 2,800 | 4.64 |
| Example 1-A14 | CNT dispersion A14 | 30 | 10B | 5.0 | CMC 3 | 20.0 | 10,800 | 2,200 | 4.90 |
| Example 1-A15 | CNT dispersion A15 | 30 | 10B | 5.0 | CMC 3 | 20.0 | 11,000 | 2,300 | 4.78 |
| Example 1-A16 | CNT dispersion A16 | 30 | 10B | 5.0 | CMC 3 | 20.0 | 13,500 | 2,800 | 4.65 |
| Example 1-A17 | CNT dispersion A17 | 10 | 10B | 5.0 | CELLOGEN 5A | 20.0 | 26,000 | 5,300 | 4.91 |
| Example 1-A18 | CNT dispersion A18 | 10 | 10B | 5.0 | CELLOGEN 6A | 150.0 | 32,000 | 5,800 | 5.52 |
| Example 1-A19 | CNT dispersion A19 | 20 | TNSR | 0.4 | APP-084 | 150.0 | 2,000 | 500 | 4.00 |
| Example 1-A20 | CNT dispersion A20 | 20 | TNSAR | 0.4 | APP-084 | 30.0 | 3,800 | 1,130 | 3.36 |
| Example 1-A21 | CNT dispersion A21 | 20 | 10B/TNSR | 1.5 | APP-084 | 30.0 | 11,500 | 1,650 | 7.00 |
| Example 1-A22 | CNT dispersion A22 | 20 | 10B/TNSR | 2.5 | APP-084 | 70.0 | 21,500 | 3,350 | 8.42 |
| Example 1-A23 | CNT dispersion A23 | 20 | 6A/TNSR | 0.8 | APP-084 | 70.0 | 2,230 | 530 | 4.20 |
| Example 1-A24 | CNT dispersion A24 | 20 | 6A/TNSR | 1.0 | APP-084 | 70.0 | 2,680 | 700 | 3.80 |
| Example 1-A25 | CNT dispersion A25 | 30 | 6A/TNSR | 1.1 | APP-084 | 70.0 | 3,800 | 930 | 3.87 |
| Example 1-B1 | CNT dispersion B1 | 10 | 10B | 5.0 | APP-084 | 20.0 | 3,000 | 830 | 3.61 |
| Example 1-B2 | CNT dispersion B2 | 20 | 10B | 5.0 | APP-084 | 20.0 | 2,000 | 780 | 2.53 |
| Example 1-B3 | CNT dispersion B3 | 30 | 10B | 5.0 | APP-084 | 20.0 | 860 | 366 | 2.35 |
| Example 1-B4 | CNT dispersion B4 | 30 | 10B | 5.0 | APP-084 | 20.0 | 42,400 | 9,700 | 4.37 |
| Example 1-C1 | CNT dispersion C1 | 10 | 10B | 2.0 | APP-084 | 20.0 | 1,210 | 280 | 4.17 |
| Example 1-C2 | CNT dispersion C2 | 20 | 10B | 2.0 | APP-084 | 20.0 | 1,050 | 260 | 4.04 |
| Example 1-C3 | CNT dispersion C3 | 30 | 10B | 2.0 | APP-084 | 20.0 | 930 | 240 | 3.88 |
| Example 1-D1 | CNT dispersion D1 | — | 10B | 2.0 | APP-084 | 20.0 | 1,440 | 347 | 4.16 |
| Example 1-D2 | CNT dispersion D2 | — | 10B | 2.0 | F01MC | 20.0 | 1,450 | 322 | 4.50 |
| Example 1-D3 | CNT dispersion D3 | — | 10B | 2.0 | CMC 1 | 20.0 | 1,280 | 298 | 4.30 |
| Example 1-D4 | CNT dispersion D4 | — | 10B | 2.0 | F10LC | 20.0 | 12,200 | 2,500 | 4.88 |
| Example 1-E1 | CB dispersion E1 | 5 | LITX200 | 15.0 | APP-084 | 10.0 | 1,200 | 280 | 4.29 |
| Example 1-E2 | CB dispersion E2 | 5 | LITXHP | 15.0 | APP-084 | 10.0 | 1,550 | 350 | 4.43 |
| Example 1-E3 | CB dispersion E3 | 5 | FX35 | 15.0 | APP-084 | 10.0 | 1,500 | 380 | 3.95 |

| | Stability | pH | Glossiness | Median diameter (μm) | Complex elastic modulus X (Pa) | Phase angle Y (°) | Product (X × Y) |
|---|---|---|---|---|---|---|---|
| Example 1-A1 | C | 9.63 | 76.9 | 0.90 | 42.70 | 26.70 | 1140 |
| Example 1-A2 | C | 9.64 | 90.2 | 0.84 | 19.80 | 34.90 | 691 |
| Example 1-A3 | B | 9.60 | 93.3 | 0.73 | 15.60 | 38.40 | 586 |
| Example 1-A4 | C | 10.00 | 58.7 | 0.95 | 43.10 | 18.50 | 797 |
| Example 1-A5 | B | 10.10 | 70.2 | 0.77 | 10.10 | 33.10 | 334 |
| Example 1-A6 | B | 10.10 | 76.5 | 0.71 | 4.74 | 42.70 | 202 |
| Example 1-A7 | B | 9.60 | 87.5 | 1.50 | 5.30 | 43.10 | 225 |
| Example 1-A8 | B | 9.50 | 83.2 | 1.43 | 5.10 | 41.50 | 312 |
| Example 1-A9 | C | 9.50 | 96.8 | 1.30 | 55.30 | 25.50 | 1410 |
| Example 1-A10 | C | 9.60 | 82.1 | 0.92 | 38.80 | 28.70 | 1114 |
| Example 1-A11 | C | 9.60 | 71.5 | 0.96 | 48.60 | 25.80 | 1254 |
| Example 1-A12 | C | 9.60 | 66.3 | 1.42 | 59.60 | 25.10 | 1496 |
| Example 1-A13 | C | 7.50 | 80.3 | 0.80 | 20.00 | 33.00 | 690 |
| Example 1-A14 | C | 7.10 | 92.5 | 0.75 | 23.20 | 28.50 | 661 |
| Example 1-A15 | C | 7.00 | 83.1 | 0.77 | 22.50 | 28.70 | 646 |
| Example 1-A16 | C | 7.50 | 81.6 | 0.80 | 20.30 | 32.20 | 654 |
| Example 1-A17 | C | 9.50 | 78.5 | 0.85 | 38.50 | 30.30 | 1167 |
| Example 1-A18 | C | 9.50 | 70.2 | 0.92 | 45.50 | 10.10 | 460 |
| Example 1-A19 | B | 9.40 | 86.1 | 1.21 | 12.10 | 35.20 | 426 |
| Example 1-A20 | B | 9.50 | 85.3 | 1.53 | 10.50 | 38.80 | 407 |
| Example 1-A21 | C | 9.60 | 86.3 | 1.43 | 46.60 | 9.30 | 433 |
| Example 1-A22 | C | 9.60 | 89.5 | 1.15 | 117.70 | 8.60 | 1012 |
| Example 1-A23 | B | 9.90 | 71.5 | 1.50 | 3.20 | 33.80 | 108 |
| Example 1-A24 | B | 10.00 | 70.8 | 0.95 | 3.20 | 37.80 | 121 |
| Example 1-A25 | B | 10.10 | 75.2 | 0.78 | 5.10 | 40.90 | 209 |
| Example 1-B1 | B | 9.50 | 98.3 | 0.71 | 11.30 | 40.90 | 453 |

TABLE 3-continued

| | | | | | | | |
|---|---|---|---|---|---|---|---|
| Example 1-B2 | | A | 9.50 | 98.9 | 0.39 | 8.93 | 44.80 | 401 |
| Example 1-B3 | | A | 9.50 | 98.9 | 1.58 | 5.06 | 53.70 | 272 |
| Example 1-B4 | | C | 9.60 | 92.1 | 0.81 | 45.00 | 26.00 | 1170 |
| Example 1-C1 | | A | 9.40 | 96.6 | 0.96 | 5.50 | 65.10 | 358 |
| Example 1-C2 | | A | 9.40 | 97.6 | 0.77 | 5.20 | 70.30 | 358 |
| Example 1-C3 | | A | 9.40 | 96.4 | 0.71 | 4.20 | 74.40 | 312 |
| Example 1-D1 | | B | 9.70 | 10.0 | 0.14 | 13.80 | 8.28 | 114 |
| Example 1-D2 | | B | 9.87 | 8.0 | 8.25 | 21.80 | 7.08 | 156 |
| Example 1-D3 | | B | 9.70 | 10.8 | 4.30 | 12.20 | 10.50 | 128 |
| Example 1-D4 | | C | 9.70 | 7.1 | 7.50 | 30.80 | 5.60 | 172 |
| Example 1-E1 | | B | 9.80 | 83.5 | 0.23 | 3.80 | 36.70 | 139 |
| Example 1-E2 | | B | 9.80 | 82.8 | 0.25 | 5.10 | 31.70 | 162 |
| Example 1-E3 | | B | 9.60 | 81.8 | 0.25 | 5.50 | 29.80 | 164 |

TABLE 4

| | Conductive material dispersion | Pass type dispersion Number of times (time) | CNT · Conductive material Type- | CNT · Conductive material Amount added (Parts) | CMC Type | CMC Amount added to CNT (parts) | Initial viscosity 6 rpm (mPa·s) | Initial viscosity 60 rpm (mPa·s) | TI value |
|---|---|---|---|---|---|---|---|---|---|
| Comparative Example 1-a1 | CNT dispersion a1 | 1 | 10B | 5.0 | APP-084 | 20 | 53,400 | 10,000 or more | — |
| Comparative Example 1-a2 | CNT dispersion a2 | 3 | 10B | 5.0 | APP-084 | 20 | 44,500 | 10,000 or more | — |
| Comparative Example 1-a3 | CNT dispersion a3 | 5 | 10B | 5.0 | APP-084 | 20 | 33,600 | 7,800 | 4.31 |
| Comparative Example 1-a4 | CNT dispersion a4 | 1 | 6A | 1.2 | APP-084 | 62.5 | 21,600 | 5,190 | 4.16 |
| Comparative Example 1-a5 | CNT dispersion a5 | 3 | 6A | 1.2 | APP-084 | 62.5 | 39,800 | 10,000 or more | — |
| Comparative Example 1-a6 | CNT dispersion a6 | 5 | 6A | 1.2 | APP-084 | 62.5 | 94,300 | 10,000 or more | — |
| Comparative Example 1-a7 | CNT dispersion a7 | 10 | 10B | 5.0 | A02SH | 20 | 53,400 | 6,900 | 7.74 |
| Comparative Example 1-a8 | CNT dispersion a8 | 20 | 10B | 5.0 | A02SH | 20 | 69,800 | 7,920 | 8.81 |
| Comparative Example 1-a9 | CNT dispersion a9 | 30 | 10B | 5.0 | A02SH | 20 | 97,500 | 10,000 or more | — |
| Comparative Example 1-a10 | CNT dispersion a10 | 20 | 10B | 5.0 | F04HC | 20 | 27,310 | 4,460 | 6.12 |
| Comparative Example 1-a11 | CNT dispersion a11 | 20 | 10B | 5.0 | F10LC | 20 | Preparation of dispersion not possible (viscosity was high and CNT concentration did not reach 5%) | | |
| Comparative Example 1-a12 | CNT dispersion a12 | 20 | 10B | 5.0 | F10MC | 20 | | | |
| Comparative Example 1-a13 | CNT dispersion a13 | 20 | 10B | 5.0 | F30MC | 20 | | | |
| Comparative Example 1-a14 | CNT dispersion a14 | 20 | 10B | 5.0 | MAC500LC | 20 | | | |
| Comparative Example 1-a15 | CNT dispersion a15 | 30 | 10B | 5.0 | APP-084 | 20.0 | 62,400 | 10,000 or more | — |
| Comparative Example 1-a16 | CB dispersion a1 | 5 | HS-100 | 20.0 | A02SH | 5 | 360 | 140 | 2.57 |
| Comparative Example 1-a17 | CB dispersion a2 | 10 | EC-300J | 5.0 | A02SH | 20 | 2,200 | 560 | 3.93 |
| Comparative Example 1-d1 | CNT dispersion b1 | — | 10B | 2.0 | F10LC | 20 | 26,870 | 5.460 | 4.92 |
| Comparative Example 1-d2 | CNT dispersion b2 | — | 10B | 2.0 | F10MC | 20 | 25,110 | 5.120 | 4.90 |
| Comparative Example 1-d3 | CNT dispersion b3 | — | 10B | 2.0 | F30MC | 20 | 31,650 | 6.630 | 4.77 |

TABLE 4-continued

| | Stability | pH | Glossiness | Median diameter (μm) | Complex elastic modulus X (Pa) | Phase angle Y (°) | Product (X × Y) |
|---|---|---|---|---|---|---|---|
| Comparative Example 1-a1 | E | 9.60 | 54.10 | 11.50 | 501.10 | 13.30 | 6865 |
| Comparative Example 1-a2 | E | 9.60 | 56.50 | 8.30 | 386.50 | 14.20 | 5468 |
| Comparative Example 1-a3 | E | 9.60 | 56.20 | 5.20 | 124.50 | 15.30 | 1905 |
| Comparative Example 1-a4 | E | 10.20 | Formation of coating film not possible | 11.60 | 392.10 | 7.60 | 2980 |
| Comparative Example 1-a5 | E | 10.20 | 40.00 | 6.15 | 609.60 | 5.45 | 3322 |
| Comparative Example 1-a6 | E | 10.20 | 46.80 | 4.69 | 505.60 | 5.38 | 2720 |
| Comparative Example 1-a7 | E | 9.70 | Formation of coating film not possible | 5.60 | Unmeasurable (Unmeasurable due to high viscosity) | | |
| Comparative Example 1-a8 | E | 9.70 | 52.12 | 4.65 | | | |
| Comparative Example 1-a9 | E | 9.70 | 59.04 | 4.54 | | | |
| Comparative Example 1-a10 | C | 10.11 | 4.73 | 5.61 | 1011.00 | 6.00 | 6066 |
| Comparative Example 1-a11 | | | Preparation of dispersion not possible (viscosity was high and CNT concentration did not reach 5%) | | | | |
| Comparative Example 1-a12 | | | | | | | |
| Comparative Example 1-a13 | | | | | | | |
| Comparative Example 1-a14 | | | | | | | |
| Comparative Example 1-a15 | E | 5.50 | Formation of coating film not possible | 10.50 | 502.00 | 4.70 | 2359 |
| Comparative Example 1-a16 | C | 8.30 | 36.30 | 5.10 | 0.43 | 60.20 | 26 |
| Comparative Example 1-a17 | C | 8.50 | 18.10 | 5.60 | 133.10 | 15.30 | 2036 |
| Comparative Example 1-d1 | E | 8.50 | 3.27 | 4.51 | 389.10 | 7.80 | 3035 |
| Comparative Example 1-d2 | E | 9.79 | 3.50 | 4.80 | 447.10 | 7.86 | 3434 |
| Comparative Example 1-d3 | E | 9.18 | 2.61 | 5.30 | 409.50 | 9.21 | 3271 |

*CNT dispersion a15 further contains 0.04 parts by mass of PAA.

(Preparation of Negative Electrode Mixture Composition and Negative Electrode)

The abbreviations described in the following description are as follows.

Silicon: silicon monoxide (SILICON MONOOXIDE SiO 1.3C 5 μm, non-volatile content 100%, manufactured by Osaka Titanium Technologies Co., Ltd.)

Artificial graphite: CGB-20 (manufactured by Nippon Graphite Industries, Co., Ltd., non-volatile content 100%)

MAC500LC: carboxymethyl cellulose sodium salt, SUNROSE Special Type, MAC500LC (manufactured by NIPPON PAPER INDUSTRIES CO., LTD., non-volatile content 100%)

SBR: styrene-butadiene rubber TRD2001 (manufactured by JSR CORPORATION, non-volatile content 48%)

Example 2-A1

A CNT dispersion (a CNT dispersion A1), MAC500LC (CMC), and water were added to a plastic container having a capacity of 150 cm³. Thereafter, the mixture was stirred at 2,000 rpm for 30 seconds by using a rotation/revolution mixer (Awa-tori Rentaro, ARE-310 manufactured by THINKY CORPORATION). After adding artificial graphite and silicon as the negative electrode active materials, the mixture was stirred at 2,000 rpm for 150 seconds by using the rotation/revolution mixer. Thereafter, SBR was added, and the mixture was stirred at 2,000 rpm for 30 seconds by using the rotation/revolution mixer. Accordingly, a negative electrode mixture composition was obtained. The non-volatile content of the negative electrode mixture composition was 48 mass %. The ratio of artificial graphite:silicon:CNT:CMC (MAC500LC):non-volatile content of SBR in the non-volatile content of the negative electrode mixture composition was 87:10:0.5:1:1.5.

The obtained negative electrode mixture composition was coated on a copper foil having a thickness of 20 μm by using an applicator and the coating film was dried at 120° C.±5° C. for 25 minutes in an electric oven. Accordingly, an electrode film was prepared. Thereafter, the electrode film was rolled by using a roll press (3t hydraulic roll press manufactured by THANK METAL CO., LTD.) and a negative electrode (a negative electrode A1) was obtained. The weight per unit of the mixture layer was 10 mg/cm². The density of the mixture layer after performing a rolling treatment was 1.6 g/cc.

Examples 2-A2 to 2-A25, 2-B1 to 2-B4, 2-C1 to 2-C3, 2-D1 to 2-D4, 2-E1 to 2-E3, and Comparative Examples 2-a1 to 2-a17, and 2-d1 to 2-d3)

Negative electrodes A2 to A25, negative electrodes B1 to B3, negative electrodes C1 to C3, negative electrodes D1 to D4, negative electrodes E1 to E3, negative electrodes a1 to a17, and negative electrodes d1 to d3 were obtained by means of the same method as in Example 2-A1 except that the CNT dispersions were changed to the CNT dispersions shown in Table 5 (CNT dispersions A2 to A25, CNT dispersions B1 to B4, CNT dispersions C1 to C3, CNT dispersions D1 to D4, CB Dispersions E1 to E3, CNT dispersions a1 to a15, CB Dispersions a1 and a2, and CNT dispersions d1 to d3).

(Method for Evaluating Conductivity of Negative Electrode)

With respect to the obtained negative electrode, the surface resistivity (Ω/□) of the mixture layer was measured by using Loresta GP, MCP-T610 manufactured by Mitsubishi Chemical Analytech Co., Ltd. After the measurement, the value was multiplied by the thickness of the mixture layer, and the resultant value was set as the volume resistivity (Ω·cm) of the negative electrode. With respect to the thickness of the mixture layer, the thickness of the copper foil was subtracted from the average value obtained by measuring three locations in the electrode by using a film thickness meter (DIGIMICRO MH-15M manufactured by NIKON CORPORATION), and the resultant value was set as the volume resistivity (Ω·cm) of the negative electrode.

Determination Criteria

A: Less than 0.3 Ω·cm (Excellent)
B: 0.3 Ω·cm or more and less than 0.5 Ω·cm (Good)
D: 0.5 Ω·cm or more (Poor)

(Method for Evaluating Adhesion of Negative Electrode)

The obtained negative electrode was cut into two rectangles of 90 mm×20 mm with the coating direction as the major axis. The peel strength was measured by using a tabletop tensile testing machine (Strograph E3 manufactured by Toyo Seiki Manufacturing Co.) and evaluated based on the 180-degree peel test method. Specifically, a 100 mm×30 mm size double-sided tape (No. 5000NS, manufactured by Nitoms, Inc.) was stuck on a stainless plate, and the mixture layer side of the prepared negative electrode was brought into close contact with the other side of the double-sided tape to obtain a test sample. Next, the test sample was fixed vertically such that the short sides of the rectangle became the upside and the downside. Peeling was performed while pulling the end of the copper foil upward from the lower side at a constant speed (50 mm/min). The mean value of the stress at this time was defined as the peel strength.

Determination Criteria

A: 0.5 N/cm or more (Excellent)
B: 0.1 N/cm or more and less than 0.5 N/cm (Good)
D: Less than 0.1 N/cm (Poor)

TABLE 5

|  | Negative electrode | Conductive material dispersion | Volume resistivity | Peel strength |
| --- | --- | --- | --- | --- |
| Example 2-A1 | Negative electrode A1 | CNT dispersion A1 | B | B |
| Example 2-A2 | Negative electrode A2 | CNT dispersion A2 | B | B |
| Example 2-A3 | Negative electrode A3 | CNT dispersion A3 | A | B |
| Example 2-A4 | Negative electrode A4 | CNT dispersion A4 | B | B |
| Example 2-A5 | Negative electrode A5 | CNT dispersion A5 | A | B |
| Example 2-A6 | Negative electrode A6 | CNT dispersion A6 | A | A |
| Example 2-A7 | Negative electrode A7 | CNT dispersion A7 | A | A |
| Example 2-A8 | Negative electrode A8 | CNT dispersion A8 | A | A |
| Example 2-A9 | Negative electrode A9 | CNT dispersion A9 | B | B |
| Example 2-A10 | Negative electrode A10 | CNT dispersion A10 | A | B |
| Example 2-A11 | Negative electrode A11 | CNT dispersion A11 | B | B |
| Example 2-A12 | Negative electrode A12 | CNT dispersion A12 | B | B |
| Example 2-A13 | Negative electrode A13 | CNT dispersion A13 | A | B |
| Example 2-A14 | Negative electrode A14 | CNT dispersion A14 | A | B |
| Example 2-A15 | Negative electrode A15 | CNT dispersion A15 | A | B |
| Example 2-A16 | Negative electrode A16 | CNT dispersion A16 | A | A |
| Example 2-A17 | Negative electrode A17 | CNT dispersion A17 | A | B |
| Example 2-A18 | Negative electrode A18 | CNT dispersion A18 | A | B |
| Example 2-A19 | Negative electrode A19 | CNT dispersion A19 | A | A |
| Example 2-A20 | Negative electrode A20 | CNT dispersion A20 | A | A |
| Example 2-A21 | Negative electrode A21 | CNT dispersion A21 | A | A |
| Example 2-A22 | Negative electrode A22 | CNT dispersion A22 | A | A |
| Example 2-A23 | Negative electrode A23 | CNT dispersion A23 | A | A |
| Example 2-A24 | Negative electrode A24 | CNT dispersion A24 | A | A |
| Example 2-A25 | Negative electrode A25 | CNT dispersion A25 | A | A |
| Example 2-B1 | Negative electrode B1 | CNT dispersion B1 | B | A |
| Example 2-B2 | Negative electrode B2 | CNT dispersion B2 | A | A |
| Example 2-B3 | Negative electrode B3 | CNT dispersion B3 | A | A |
| Example 2-B4 | Negative electrode B4 | CNT dispersion B4 | B | B |
| Example 2-C1 | Negative electrode C1 | CNT dispersion C1 | B | B |
| Example 2-C2 | Negative electrode C2 | CNT dispersion C2 | B | B |
| Example 2-C3 | Negative electrode C3 | CNT dispersion C3 | A | B |
| Example 2-D1 | Negative electrode D1 | CNT dispersion D1 | B | B |
| Example 2-D2 | Negative electrode D2 | CNT dispersion D2 | B | B |
| Example 2-D3 | Negative electrode D3 | CNT dispersion D3 | B | B |
| Example 2-D4 | Negative electrode D4 | CNT dispersion D4 | B | B |
| Example 2-E1 | Negative electrode E1 | CB dispersion E1 | B | B |

TABLE 5-continued

| | Negative electrode | Conductive material dispersion | Volume resistivity | Peel strength |
|---|---|---|---|---|
| Example 2-E2 | Negative electrode E2 | CB dispersion E2 | B | B |
| Example 2-E3 | Negative electrode E3 | CB dispersion E3 | B | B |
| Comparative Example 2- a1 | Negative electrode a1 | CNT dispersion a1 | D | B |
| Comparative Example 2- a2 | Negative electrode a2 | CNT dispersion a2 | D | B |
| Comparative Example 2- a3 | Negative electrode a3 | CNT dispersion a3 | D | B |
| Comparative Example 2- a4 | Negative electrode a4 | CNT dispersion a4 | D | B |
| Comparative Example 2- a5 | Negative electrode a5 | CNT dispersion a5 | D | B |
| Comparative Example 2- a6 | Negative electrode a6 | CNT dispersion a6 | D | B |
| Comparative Example 2- a7 | Negative electrode a7 | CNT dispersion a7 | D | D |
| Comparative Example 2- a8 | Negative electrode a8 | CNT dispersion a8 | D | D |
| Comparative Example 2- a9 | Negative electrode a9 | CNT dispersion a9 | D | D |
| Comparative Example 2- a10 | Negative electrode a10 | CNT dispersion a10 | D | B |
| Comparative Example 2- a11 | Negative electrode a11 | CNT dispersion a11 | D | B |
| Comparative Example 2- a12 | Negative electrode a12 | CNT dispersion a12 | D | B |
| Comparative Example 2- a13 | Negative electrode a13 | CNT dispersion a13 | D | D |
| Comparative Example 2- a14 | Negative electrode a14 | CNT dispersion a14 | D | D |
| Comparative Example 2- a15 | Negative electrode a15 | CNT dispersion a15 | D | D |
| Comparative Example 2- a16 | Negative electrode a16 | CB dispersion a1 | D | B |
| Comparative Example 2- a17 | Negative electrode a17 | CB dispersion a2 | B | D |
| Comparative Example 2- d1 | Negative electrode d1 | CNT dispersion b1 | D | D |
| Comparative Example 2- d2 | Negative electrode d2 | CNT dispersion b2 | D | D |
| Comparative Example 2- d3 | Negative electrode d3 | CNT dispersion b3 | D | D |

All of the negative electrodes using the conductive material dispersions of the above embodiments had good conductivity and adhesion. This may be due to the fact that the dispersing agent was able to act effectively by satisfying the structural requirements of the above embodiments. Furthermore, the carbon layer of the fine silicon-based active material coated with carbon used in the examples has a surface state similar to that of the CNT in which the amount of acidic groups in the above embodiment is in a specific range, and the silicon-based active material has a surface which is negatively charged in water. From the above, the carbon layer has a particularly excellent interaction with the CNT dispersion, and the reason seems to be because a good material distribution state is formed even in the dried electrode film.

(Preparation of Positive Electrode Mixture Composition and Positive Electrode)

The abbreviations described in the following description are as follows.

LFP: lithium iron phosphate HED (trademark) LFP-400 (manufactured by BASF, non-volatile content 100%)

PTFE: polytetrafluoroethylene Polyflon PTFE D-210C (manufactured by DAIKIN INDUSTRIES, LTD., non-volatile content 60%)

MAC500LC: carboxymethyl cellulose sodium salt, SUNROSE Special Type MAC500LC (manufactured by NIPPON PAPER INDUSTRIES CO., LTD., non-volatile content 100%)

Example 3-A1

A conductive material dispersion (a conductive material dispersion A1), MACS500LC, and water were added to a plastic container having a capacity of 150 cm$^3$. Thereafter, the mixture was stirred at 2,000 rpm for 30 seconds by using a rotation/revolution mixer (Awa-tori Rentaro, ARE-310 manufactured by THINKY CORPORATION). Then, LFP was added as a positive electrode active material, and the mixture was stirred at 2,000 rpm for 150 seconds by using the rotation/revolution mixer (Awa-tori Rentaro, ARE-310 manufactured by THINKY CORPORATION). Thereafter, PTFE was added and the mixture was stirred at 2,000 rpm for 30 seconds by using the rotation/revolution mixer (Awa-tori Rentaro, ARE-310 manufactured by THINKY CORPORATION). Accordingly, a positive electrode mixture composition was obtained. The non-volatile content of the positive electrode mixture composition was 75 mass %. Among the non-volatile content of the positive electrode mixture composition, the ratio of LFP:conductive material: PTFE:non-volatile content of MAC500LC was 97:0.5:1:1.5.

The positive electrode mixture composition was coated on an aluminum foil having a thickness of 20 μm by using an applicator and then dried in an electric oven at 120° C.±5° C. for 25 minutes to prepare an electrode film. Thereafter, the electrode film was rolled by means of a roll press (3t hydraulic roll press manufactured by THANK METAL CO., LTD) and accordingly a positive electrode (a positive electrode A1) was obtained. The weight per unit of the mixture layer was 20 mg/cm². The density of the mixture layer after performing the rolling treatment was 2.1 g/cc.

Examples 3-A2 to 3-A25, 3-B1 to 3-B4, 3-C1 to 3-C3, 3-D1 to 3-D4, 3-E1 to 3-E3, and Comparative Examples 3-a1 to 3-a17, and 3-d1 to 3-d3)

Positive electrodes A2 to A25, positive electrodes B1 to B3, positive electrodes C1 to C3, positive electrodes D1 to D4, positive electrodes a1 to a17, and positive electrodes d1 to d3 were obtained by means of the same method as in Example 3-A1 except that the CNT dispersions were changed to the CNT dispersions shown in Table 6 (CNT dispersions A2 to A25, CNT dispersions B1 to B4, CNT dispersions C1 to C3, CNT dispersions D1 to D4, CB Dispersions E1 to E3, CNT dispersions a1 to a15, dispersions a1 and a2, and CNT dispersions d1 to d3).

(Method for Evaluating Conductivity of Positive Electrode)

Conductivity of the obtained positive electrode was evaluated by means of the same method as the negative electrode except that aluminum foil was used instead of copper foil.

Determination Criteria

A: Less than 10 Ω·cm (Excellent)
B: 10 Ω·cm or more and less than 20 Ω·cm (Good)
D: 20 Ω·cm or more (Poor)

(Method for Evaluating Adhesion of Positive Electrode)

Adhesion of the obtained positive electrode was evaluated by means of the same method as the negative electrode except that aluminum foil was used instead of copper foil.

Determination Criteria

A: 1 N/cm or more (Excellent)
B: 0.5 N/cm or more and less than 1 N/cm (Good)
D: less than 0.5 N/cm (Poor)

TABLE 6

| | Positive electrode | Conductive material dispersion | Volume resistivity | Peel strength |
|---|---|---|---|---|
| Example 3-A1 | Positive electrode A1 | CNT dispersion A1 | B | B |
| Example 3-A2 | Positive electrode A2 | CNT dispersion A2 | B | B |
| Example 3-A3 | Positive electrode A3 | CNT dispersion A3 | B | B |
| Example 3-A4 | Positive electrode A4 | CNT dispersion A4 | B | B |
| Example 3-A5 | Positive electrode A5 | CNT dispersion A5 | B | B |
| Example 3-A6 | Positive electrode A6 | CNT dispersion A6 | A | A |
| Example 3-A7 | Positive electrode A7 | CNT dispersion A7 | A | A |
| Example 3-A8 | Positive electrode A8 | CNT dispersion A8 | A | A |
| Example 3-A9 | Positive electrode A9 | CNT dispersion A9 | B | B |
| Example 3-A10 | Positive electrode A10 | CNT dispersion A10 | A | B |
| Example 3-A11 | Positive electrode A11 | CNT dispersion A11 | B | B |
| Example 3-A12 | Positive electrode A12 | CNT dispersion A12 | B | B |
| Example 3-A13 | Positive electrode A13 | CNT dispersion A13 | A | B |
| Example 3-A14 | Positive electrode A14 | CNT dispersion A14 | A | B |
| Example 3-A15 | Positive electrode A15 | CNT dispersion A15 | A | B |
| Example 3-A16 | Positive electrode A16 | CNT dispersion A16 | A | A |
| Example 3-A17 | Positive electrode A17 | CNT dispersion A17 | A | B |
| Example 3-A18 | Positive electrode A18 | CNT dispersion A18 | A | B |
| Example 3-A19 | Positive electrode A19 | CNT dispersion A19 | A | A |
| Example 3-A20 | Positive electrode A20 | CNT dispersion A20 | A | A |
| Example 3-A21 | Positive electrode A21 | CNT dispersion A21 | A | A |
| Example 3-A22 | Positive electrode A22 | CNT dispersion A22 | A | A |
| Example 3-A23 | Positive electrode A23 | CNT dispersion A23 | A | A |
| Example 3-A24 | Positive electrode A24 | CNT dispersion A24 | A | A |
| Example 3-A25 | Positive electrode A25 | CNT dispersion A25 | A | A |
| Example 3-B1 | Positive electrode B1 | CNT dispersion B1 | B | A |
| Example 3-B2 | Positive electrode B2 | CNT dispersion B2 | A | A |
| Example 3-B3 | Positive electrode B3 | CNT dispersion B3 | A | A |
| Example 3-B4 | Positive electrode B4 | CNT dispersion B4 | B | B |
| Example 3-C1 | Positive electrode C1 | CNT dispersion C1 | B | B |
| Example 3-C2 | Positive electrode C2 | CNT dispersion C2 | B | B |
| Example 3-C3 | Positive electrode C3 | CNT dispersion C3 | A | B |
| Example 3-D1 | Positive electrode D1 | CNT dispersion D1 | B | B |
| Example 3-D2 | Positive electrode D2 | CNT dispersion D2 | B | B |
| Example 3-D3 | Positive electrode D3 | CNT dispersion D3 | B | B |
| Example 3-D4 | Negative electrode D4 | CNT dispersion D4 | B | B |
| Example 3-E1 | Negative electrode E1 | CB dispersion E1 | B | B |
| Example 3-E2 | Negative electrode E2 | CB dispersion E2 | B | B |
| Example 3-E3 | Negative electrode E3 | CB dispersion E3 | B | B |
| Comparative Example 3- a1 | Positive electrode a1 | CNT dispersion a1 | D | D |
| Comparative Example 3- a2 | Positive electrode a2 | CNT dispersion a2 | D | D |
| Comparative Example 3- a3 | Positive electrode a3 | CNT dispersion a3 | D | D |
| Comparative Example 3- a4 | Positive electrode a4 | CNT dispersion a4 | D | D |
| Comparative Example 3- a5 | Positive electrode a5 | CNT dispersion a5 | D | B |

TABLE 6-continued

| Positive electrode | | Conductive material dispersion | Volume resistivity | Peel strength |
|---|---|---|---|---|
| Comparative Example 3- a6 | Positive electrode a6 | CNT dispersion a6 | D | B |
| Comparative Example 3- a7 | Positive electrode a7 | CNT dispersion a7 | D | D |
| Comparative Example 3- a8 | Positive electrode a8 | CNT dispersion a8 | D | D |
| Comparative Example 3- a9 | Positive electrode a9 | CNT dispersion a9 | D | D |
| Comparative Example 3- a10 | Positive electrode a10 | CNT dispersion a10 | D | D |
| Comparative Example 3- a11 | Positive electrode a11 | CNT dispersion a11 | D | B |
| Comparative Example 3- a12 | Positive electrode a12 | CNT dispersion a12 | D | B |
| Comparative Example 3- a13 | Positive electrode a13 | CNT dispersion a13 | D | D |
| Comparative Example 3- a14 | Positive electrode a14 | CNT dispersion a14 | D | D |
| Comparative Example 3- a15 | Positive electrode a15 | CNT dispersion a15 | D | D |
| Comparative Example 3- a16 | Positive electrode a16 | CB dispersion a1 | D | B |
| Comparative Example 3- a17 | Positive electrode a17 | CB dispersion a2 | B | D |
| Comparative Example 3- d1 | Positive electrode d1 | CNT dispersion b1 | D | D |
| Comparative Example 3- d2 | Positive electrode d2 | CNT dispersion b2 | D | D |
| Comparative Example 3- d3 | Positive electrode d3 | CNT dispersion b3 | D | D |

All of the positive electrodes using the conductive material dispersions of the above embodiments had good conductivity and adhesion. This may be due to the fact that, as in the case of the negative electrode, the dispersing agent was able to act effectively by satisfying the structural requirements of the above embodiments. Further, as in the case of the silicon-based active material, the carbon layer of the fine lithium iron phosphate coated with carbon used in the examples has a surface state similar to that of the CNT in which the amount of acidic groups is in a specific range, and the lithium iron phosphate has a surface which is negatively charged in water. From the above, the carbon layer has a particularly excellent interaction with the CNT dispersion, and the reason seems to be because a good material distribution state is formed even in the dried electrode film.

(Preparation of Standard Positive Electrode)

Amounts of 92 parts by mass of LFP (HED (trademark) LFP-400, manufactured by BASF, non-volatile content 100%), 4 parts by mass of acetylene black (Denka black (registered trademark) HS-100, manufactured by Denka Company Limited., non-volatile content 100%), and 1.6 parts by mass of MAC500LC (carboxymethyl cellulose sodium salt SUNROSE Special Type MAC500L, manufactured by NIPPON PAPER INDUSTRIES CO., LTD., non-volatile content 100%) as positive electrode active materials were added to a plastic container having a capacity of 150 ml. Then the mixture was mixed by using a spatula until the powders became uniform. Thereafter, 25 parts by mass of water was added and the mixture was stirred at 2,000 rpm for 30 seconds by using a rotation/revolution mixer (Awa-tori Rentaro, ARE-310 manufactured by THINKY CORPORATION). Thereafter, the mixture in the plastic container was mixed by using the spatula until the mixture became uniform. An amount of 4 parts by mass of PTFE (manufactured by DAIKIN INDUSTRIES, LTD., non-volatile content 60 mass %) was added and the mixture was stirred at 2,000 rpm for 30 seconds by using the rotation/revolution mixer. Thereafter, 11.2 parts by mass of water was added, and the mixture was stirred at 2,000 rpm for 30 seconds by using the rotation/revolution mixer. Finally, the mixture was stirred at 3,000 rpm for 10 minutes by using a high-speed agitator. Accordingly, a standard positive electrode mixture composition was obtained. The non-volatile content of the standard positive electrode mixture composition was 79 mass %.

The above described standard positive electrode mixture composition was coated on an aluminum foil with a thickness of 20 µm serving as a current collector by using an applicator. Thereafter, the composition was dried at 120° C.±5° C. for 25 minutes in an electric oven and an adjustment was made such that the weight per unit area of the electrode became 20 mg/cm². A rolling treatment was performed by using a roll press (3t hydraulic roll press manufactured by THANK METAL CO., LTD.) and accordingly a standard positive electrode in which a mixture layer density was 2.1 g/cm³ was prepared.

(Preparation of Standard Negative Electrode)

Amounts of 0.5 parts by mass of acetylene black (Denka black (registered trademark) HS-100, manufactured by Denka Company Limited.), 1 part by mass of MAC500LC (carboxymethyl cellulose sodium salt SUNROSE Special Type MAC500L, manufactured by NIPPON PAPER INDUSTRIES CO., LTD., non-volatile content 100%), and 98.4 parts by mass of water were added to a plastic container having a capacity of 150 ml. Thereafter, the mixture was stirred at 2,000 rpm for 30 seconds by using a rotation/revolution mixer (Awa-tori Rentaro, ARE-310 manufactured by THINKY CORPORATION). Further, 87 parts by mass of artificial graphite (CGB-20, manufactured by Nippon Graphite Industries, Co., Ltd.) and 10 parts by mass of silicon were added to the mixture as active materials and the resultant mixture was stirred at 2,000 rpm for 150 seconds by using the rotation/revolution mixer (Awa-tori Rentaro, ARE-310 manufactured by THINKY CORPORATION). Subsequently, 3.1 parts by mass of SBR (TRD2001, manufactured by JSR CORPORATION) was added to the mixture and the resultant mixture was stirred at 2,000 rpm for 30 seconds by using the rotation/revolution mixer (Awa-tori Rentaro, ARE-310 manufactured by THINKY CORPORATION). Accordingly, a standard negative electrode mixture composition was obtained. The non-volatile content of the standard negative electrode mixture composition was 50 mass %.

The above described standard negative electrode mixture composition was coated on a copper foil with a thickness of 20 μm serving as a current collector by using an applicator. Thereafter, the composition was dried at 80° C.±5° C. for 25 minutes in an electric oven and an adjustment was made such that the weight per unit area of the electrode became 10 mg/cm². A rolling treatment was performed by using a roll press (3t hydraulic roll press manufactured by THANK METAL CO., LTD.), and accordingly a standard negative electrode in which a mixture layer density was 1.6 g/cm³ was prepared.

Examples 4-A1 to 4-A25, 4-B1 to 4-B4, 4-C1 to 4-C3, 4-D1 to 4-D4, 4-E1 to 4-E3, and Comparative Examples 4-a1 to 4-a17 and 4-d1 to 4-d3

Examples 5-A1 to 5-A25, 5-B1 to 5-B4, 5-C1 to 5-C3, 5-D1 to 5-D4, 5-E1 to 5-E3, and Comparative Examples 5-A1 to 5-A17, and 5-d1 to 5-d3

(Preparation of Secondary Battery)

The negative electrode and the positive electrode shown in Tables 7 and 8 were punched into 50 mm×45 mm and 45 mm×40 mm shapes, and a separator (a porous polypropylene film) inserted between the electrodes and the punched electrodes were inserted into an aluminum laminate bag. The electrodes and the separator were dried in an electric oven at 70° C. for 1 hour. Thereafter, 2 mL of electrolyte was injected into a glove box filled with argon gas. The electrolyte was nonaqueous electrolyte obtained by preparing a mixed solvent in which ethylene carbonate, dimethyl carbonate, and diethyl carbonate are mixed at a volume ratio of 1:1:1, adding 1 part by mass of vinylene carbonate as an additive relative to 100 parts by mass, and then dissolving LiPF6 at a concentration of 1M. Then, the aluminum laminate bag was sealed and a secondary battery was prepared.

(Method for Evaluating Rate Characteristic of Secondary Battery)

The obtained secondary battery was placed in a constant temperature chamber at 25° C. and charge/discharge measurement was performed by using a charge/discharge device (SM-8 manufactured by HOKUTO DENKO CORPORATION). Constant current/constant voltage charging (a cutoff current of 1 mA (0.02 C)) was performed at a charge termination voltage of 4.3 V and a charging current of 10 mA (0.2 C). Thereafter, constant current discharge was performed at a discharge termination voltage of 3 V and a discharging current of 10 mA (0.2 C). After repeating the above operation three times, constant current/constant voltage charging (a cutoff current (1 mA (0.02 C)) was performed at a charging current of 10 mA (0.2 C) and a charge termination voltage of 4.3 V and constant current discharge was performed at discharging currents of 0.2 C and 3 C until the discharge termination voltage reached 3.0 V. Accordingly, discharge capacities were obtained. The rate characteristic can be expressed by means of Mathematical Formula 1 below by using the ratio of the 0.2 C discharge capacity to the 3C discharge capacity.

Rate characteristic=3 C discharge capacity/third 0.2 C discharge capacity×100(%) (Mathematical Formula 1)

Determination Criteria
A: 80% or more (Excellent)
B: 60% or more and less than 80% (Good)
D: Less than 60% (Poor)

(Method for Evaluating Cycle Characteristic of Secondary Battery)

The obtained secondary battery was placed in a constant temperature chamber at 25° C. and charge/discharge measurement was performed by using a charge/discharge device (SM-8 manufactured by HOKUTO DENKO CORPORATION). After performing constant current/constant voltage charging (a cutoff current of 2.5 mA (0.05 C)) at a charge termination voltage of 4.3 V and a charging current of 25 mA (0.5 C), constant current discharge was performed at a discharge termination voltage of 3 V and a discharging current of 25 mA (0.5 C). The above operation was repeated 200 times. The cycle characteristic can be expressed by means of Mathematical Formula 2 below by using the ratio of the third 0.5 C discharge capacity to the 200th 0.5 C discharge capacity at 25° C.

Cycle characteristic=3rd 0.5 C discharge capacity/ 200th 0.5 C discharge capacity×100(%Mathematical Formula 2)

Determination Criteria
A: 85% or more (Excellent)
B: 80% or more and less than 85% (Good)
D: Less than 80% (Poor)

TABLE 7

| | Positive electrode | Negative electrode | Rate characteristic | Cycle characteristic |
|---|---|---|---|---|
| Example 4-A1 | Standard positive electrode | Negative electrode A1 | B | B |
| Example 4-A2 | Standard positive electrode | Negative electrode A2 | B | B |
| Example 4-A3 | Standard positive electrode | Negative electrode A3 | A | A |
| Example 4-A4 | Standard positive electrode | Negative electrode A4 | B | B |
| Example 4-A5 | Standard positive electrode | Negative electrode A5 | A | B |
| Example 4-A6 | Standard positive electrode | Negative electrode A6 | A | A |
| Example 4-A7 | Standard positive electrode | Negative electrode A7 | A | A |
| Example 4-A8 | Standard positive electrode | Negative electrode A8 | A | A |
| Example 4-A9 | Standard positive electrode | Negative electrode A9 | B | B |
| Example 4-A10 | Standard positive electrode | Negative electrode A10 | A | B |
| Example 4-A11 | Standard positive electrode | Negative electrode A11 | B | B |
| Example 4-A12 | Standard positive electrode | Negative electrode A12 | B | B |
| Example 4-A13 | Standard positive electrode | Negative electrode A13 | A | B |
| Example 4-A14 | Standard positive electrode | Negative electrode A14 | A | B |
| Example 4-A15 | Standard positive electrode | Negative electrode A15 | A | A |

TABLE 7-continued

| | Positive electrode | Negative electrode | Rate characteristic | Cycle characteristic |
|---|---|---|---|---|
| Example 4-A16 | Standard positive electrode | Negative electrode A16 | A | A |
| Example 4-A17 | Standard positive electrode | Negative electrode A17 | A | B |
| Example 4-A18 | Standard positive electrode | Negative electrode A18 | A | B |
| Example 4-A19 | Standard positive electrode | Negative electrode A19 | A | A |
| Example 4-A20 | Standard positive electrode | Negative electrode A20 | A | A |
| Example 4-A21 | Standard positive electrode | Negative electrode A21 | A | A |
| Example 4-A22 | Standard positive electrode | Negative electrode A22 | A | A |
| Example 4-A23 | Standard positive electrode | Negative electrode A23 | A | A |
| Example 4-A24 | Standard positive electrode | Negative electrode A24 | A | A |
| Example 4-A25 | Standard positive electrode | Negative electrode A25 | A | A |
| Example 4-B1 | Standard positive electrode | Negative electrode B1 | B | A |
| Example 4-B2 | Standard positive electrode | Negative electrode B2 | A | A |
| Example 4-B3 | Standard positive electrode | Negative electrode B3 | A | B |
| Example 4-B4 | Standard positive electrode | Negative electrode B4 | B | B |
| Example 4-C1 | Standard positive electrode | Negative electrode C1 | B | B |
| Example 4-C2 | Standard positive electrode | Negative electrode C2 | B | B |
| Example 4-C3 | Standard positive electrode | Negative electrode C3 | A | A |
| Example 4-D1 | Standard positive electrode | Negative electrode D1 | B | B |
| Example 4-D2 | Standard positive electrode | Negative electrode D2 | B | B |
| Example 4-D3 | Standard positive electrode | Negative electrode D3 | B | B |
| Example 4-D4 | Standard positive electrode | Negative electrode D4 | B | B |
| Example 4-E1 | Standard positive electrode | Negative electrode E1 | B | B |
| Example 4-E2 | Standard positive electrode | Negative electrode E2 | B | B |
| Example 4-E3 | Standard positive electrode | Negative electrode E3 | B | B |
| Comparative Example 4-a1 | Standard positive electrode | Negative electrode a1 | D | D |
| Comparative Example 4-a2 | Standard positive electrode | Negative electrode a2 | D | D |
| Comparative Example 4-a3 | Standard positive electrode | Negative electrode a3 | D | D |
| Comparative Example 4-a4 | Standard positive electrode | Negative electrode a4 | D | D |
| Comparative Example 4-a5 | Standard positive electrode | Negative electrode a5 | D | D |
| Comparative Example 4-a6 | Standard positive electrode | Negative electrode a6 | D | D |
| Comparative Example 4-a7 | Standard positive electrode | Negative electrode a7 | D | D |
| Comparative Example 4-a8 | Standard positive electrode | Negative electrode a8 | D | D |
| Comparative Example 4-a9 | Standard positive electrode | Negative electrode a9 | D | D |
| Comparative Example 4-a10 | Standard positive electrode | Negative electrode a10 | D | D |
| Comparative Example 4-a11 | Standard positive electrode | Negative electrode a11 | D | D |
| Comparative Example 4-a12 | Standard positive electrode | Negative electrode a12 | D | D |
| Comparative Example 4-a13 | Standard positive electrode | Negative electrode a13 | D | D |
| Comparative Example 4-a14 | Standard positive electrode | Negative electrode a14 | D | D |
| Comparative Example 4-a15 | Standard positive electrode | Negative electrode a15 | D | D |
| Comparative Example 4-a16 | Standard positive electrode | Negative electrode a16 | D | D |
| Comparative Example 4-a17 | Standard positive electrode | Negative electrode a17 | D | D |
| Comparative Example 4-d1 | Standard positive electrode | Negative electrode d1 | D | D |
| Comparative Example 4-d2 | Standard positive electrode | Negative electrode d2 | D | D |
| Comparative Example 4-d3 | Standard positive electrode | Negative electrode d3 | D | D |

TABLE 8

| | Positive electrode | Negative electrode | Rate characteristic | Cycle characteristic |
|---|---|---|---|---|
| Example 5-A1 | Positive electrode A1 | Standard negative electrode | B | B |
| Example 5-A2 | Positive electrode A2 | Standard negative electrode | A | B |
| Example 5-A3 | Positive electrode A3 | Standard negative electrode | A | B |
| Example 5-A4 | Positive electrode A4 | Standard negative electrode | B | B |

TABLE 8-continued

|  | Positive electrode | Negative electrode | Rate characteristic | Cycle characteristic |
|---|---|---|---|---|
| Example 5-A5 | Positive electrode A5 | Standard negative electrode | A | B |
| Example 5-A6 | Positive electrode A6 | Standard negative electrode | A | B |
| Example 5-A7 | Positive electrode A7 | Standard negative electrode | A | B |
| Example 5-A8 | Positive electrode A8 | Standard negative electrode | A | B |
| Example 5-A9 | Positive electrode A9 | Standard negative electrode | B | B |
| Example 5-A10 | Positive electrode A10 | Standard negative electrode | A | B |
| Example 5-A11 | Positive electrode A11 | Standard negative electrode | B | B |
| Example 5-A12 | Positive electrode A12 | Standard negative electrode | B | B |
| Example 5-A13 | Positive electrode A13 | Standard negative electrode | A | B |
| Example 5-A14 | Positive electrode A14 | Standard negative electrode | A | B |
| Example 5-A15 | Positive electrode A15 | Standard negative electrode | A | B |
| Example 5-A16 | Positive electrode A16 | Standard negative electrode | A | B |
| Example 5-A17 | Positive electrode A17 | Standard negative electrode | A | B |
| Example 5-A18 | Positive electrode A18 | Standard negative electrode | A | B |
| Example 5-A19 | Positive electrode A19 | Standard negative electrode | A | B |
| Example 5-A20 | Positive electrode A20 | Standard negative electrode | A | B |
| Example 5-A21 | Positive electrode A21 | Standard negative electrode | A | B |
| Example 5-A22 | Positive electrode A22 | Standard negative electrode | A | B |
| Example 5-A23 | Positive electrode A23 | Standard negative electrode | A | B |
| Example 5-A24 | Positive electrode A24 | Standard negative electrode | A | B |
| Example 5-A25 | Positive electrode A25 | Standard negative electrode | A | B |
| Example 5-B1 | Positive electrode B1 | Standard negative electrode | B | B |
| Example 5-B2 | Positive electrode B2 | Standard negative electrode | A | B |
| Example 5-B3 | Positive electrode B3 | Standard negative electrode | A | B |
| Example 5-B4 | Positive electrode B4 | Standard negative electrode | B | B |
| Example 5-C1 | Positive electrode C1 | Standard negative electrode | B | B |
| Example 5-C2 | Positive electrode C2 | Standard negative electrode | B | B |
| Example 5-C3 | Positive electrode C3 | Standard negative electrode | A | B |
| Example 5-D1 | Positive electrode D1 | Standard negative electrode | B | B |
| Example 5-D2 | Positive electrode D2 | Standard negative electrode | B | B |
| Example 5-D3 | Positive electrode D3 | Standard negative electrode | B | B |
| Example 5-D4 | Positive electrode D4 | Standard negative electrode | B | B |
| Example 5-E1 | Positive electrode E1 | Standard negative electrode | B | B |
| Example 5-E2 | Positive electrode E2 | Standard negative electrode | B | B |
| Example 5-E3 | Positive electrode E3 | Standard negative electrode | B | B |
| Comparative Example 5-a1 | Positive electrode a1 | Standard negative electrode | D | B |
| Comparative Example 5-a2 | Positive electrode a2 | Standard negative electrode | D | B |
| Comparative Example 5-a3 | Positive electrode a3 | Standard negative electrode | D | B |
| Comparative Example 5-a4 | Positive electrode a4 | Standard negative electrode | D | B |
| Comparative Example 5-a5 | Positive electrode a5 | Standard negative electrode | D | B |
| Comparative Example 5-a6 | Positive electrode a6 | Standard negative electrode | D | B |
| Comparative Example 5-a7 | Positive electrode a7 | Standard negative electrode | D | B |
| Comparative Example 5-a8 | Positive electrode a8 | Standard negative electrode | D | B |
| Comparative Example 5-a9 | Positive electrode a9 | Standard negative electrode | D | B |
| Comparative Example 5-a10 | Positive electrode a10 | Standard negative electrode | D | B |
| Comparative Example 5-a11 | Positive electrode a11 | Standard negative electrode | D | B |
| Comparative Example 5-a12 | Positive electrode a12 | Standard negative electrode | D | B |
| Comparative Example 5-a13 | Positive electrode a13 | Standard negative electrode | D | B |
| Comparative Example 5-a14 | Positive electrode a14 | Standard negative electrode | D | B |
| Comparative Example 5-a15 | Positive electrode a15 | Standard negative electrode | D | B |
| Comparative Example 5-a16 | Positive electrode a16 | Standard negative electrode | D | B |
| Comparative Example 5-a17 | Positive electrode a17 | Standard negative electrode | D | B |
| Comparative Example 5-d1 | Positive electrode d1 | Standard negative electrode | D | B |
| Comparative Example 5-d2 | Positive electrode d2 | Standard negative electrode | D | B |
| Comparative Example 5-d3 | Positive electrode d3 | Standard negative electrode | D | B |

What is claimed is:

1. A conductive material dispersion comprising:
a carbon nanotube;
carboxymethyl cellulose or its salt; and
water, wherein
a specific surface area of the carbon nanotube is 490 m$^2$/g or more,
the carboxymethyl cellulose or its salt has a weight average molecular weight of 10,000 to 100,000 and an etherification degree of 0.5 to 0.9,
a median diameter of particles in the conductive material dispersion is 0.5 μm or more and 2.0 μm or less, and
a product of a complex elastic modulus (Pa) and a phase angle) (°) of the conductive material dispersion is 100 or more and 1,500 or less.

2. A conductive material dispersion comprising:
a carbon nanotube;
carboxymethyl cellulose or its salt; and
water, wherein
the carboxymethyl cellulose or its salt has a weight average molecular weight of 10,000 to 100,000 and an etherification degree of 0.5 to 0.9,
a median diameter of particles in the conductive material dispersion is 0.5 μm or more and 2.0 μm or less,
a product of a complex elastic modulus (Pa) and a phase angle (°) of the conductive material dispersion is 100 or more and 1,500 or less, and
an amount of an acidic group of the carbon nanotube is 40 to 500 μmol/g.

3. The conductive material dispersion according to claim 2, wherein
the carbon nanotube includes a first carbon nanotube having an average outer diameter of 0.5 nm or more and less than 5 nm and a second carbon nanotube having an average outer diameter of 5 nm or more and 20 nm or less, and
a mass ratio of the first carbon nanotube to the second carbon nanotube is 1:10 to 1:100.

4. The conductive material dispersion according to claim 2, further comprising:
a polyacrylic acid.

5. A method for producing the conductive material dispersion according to claim 2 in which steps of (1) and (2) below are performed in this order, the method comprising:

(1) a step of performing dispersing at a pressure of 60 to 120 MPa by using a high-pressure homogenizer and setting a median diameter to 4.0 μm or less; and
(2) a step of performing dispersing until a phase angle becomes 40 degrees or more by using a bead mill.

6. A composition for a secondary battery electrode comprising:
the conductive material dispersion according to claim 2.

7. An electrode film comprising:
a coating film of the composition for a secondary battery electrode according to claim 6.

8. A secondary battery comprising:
the electrode film according to claim 7.

9. A vehicle comprising:
the secondary battery according to claim 8.

10. A conductive material dispersion comprising:
a carbon nanotube;
carboxymethyl cellulose or its salt; and
water, wherein
the carboxymethyl cellulose or its salt has a weight average molecular weight of 10,000 to 100,000 and an etherification degree of 0.5 to 0.9,
an amount of an acidic group of the carbon nanotube is 0.1 to 0.8 μmol/m$^2$, and
a product of a complex elastic modulus (Pa) and a phase angle) (°) of the conductive material dispersion is 100 or more and 1,500 or less.

11. The conductive material dispersion according to claim 10, wherein the complex elastic modulus is 50 Pa or less and the phase angle is 15 degrees or more.

12. The conductive material dispersion according to claim 10, wherein the conductive material dispersion has a TI value of 2.0 to 5.0.

13. The conductive material dispersion according to claim 10, wherein a gloss of a coating film of the conductive material dispersion, measured at 60 degrees relative to an angle of incidence, is 5 to 120.

14. The conductive material dispersion according to claim 10, wherein the conductive material dispersion has a pH of 7.0 to 10.5.

15. A composition for a secondary battery electrode comprising:
the conductive material dispersion according to claim 10.

16. An electrode film comprising:
a coating film of the composition for a secondary battery electrode according to claim 15.

17. A secondary battery comprising:
the electrode film according to claim 16.

18. A vehicle comprising:
the secondary battery according to claim 17.

19. The conductive material dispersion according to claim 10, wherein an amount of the carboxymethyl cellulose or its salt is from 10 to 100 mass % based on a mass of the conductive material.

* * * * *